United States Patent
Mao et al.

(10) Patent No.: US 11,239,708 B2
(45) Date of Patent: Feb. 1, 2022

(54) IN-BAND COMMUNICATION DURING WIRELESS BATTERY CHARGING

(71) Applicant: Huawei Technologies Co., Ltd., Shenzhen (CN)

(72) Inventors: Xiaolin Mao, Cupertino, CA (US); Baoshan Wu, Shenzhen (CN); Songnan Yang, Frisco, TX (US); Haihong Wei, Shenzhen (CN); Wei Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 307 days.

(21) Appl. No.: 16/555,695

(22) Filed: Aug. 29, 2019

(65) Prior Publication Data

US 2020/0076249 A1    Mar. 5, 2020

Related U.S. Application Data

(63) Continuation of application No. PCT/CN2019/084571, filed on Apr. 26, 2019.
(Continued)

(51) Int. Cl.
*H02J 50/80*    (2016.01)
*H02J 7/02*    (2016.01)
(Continued)

(52) U.S. Cl.
CPC .............. *H02J 50/80* (2016.02); *H02J 7/025* (2013.01); *H02J 50/12* (2016.02); *H04B 5/0037* (2013.01); *H04B 5/0075* (2013.01)

(58) Field of Classification Search
CPC ..................................................... H02J 50/80
(Continued)

(56) References Cited

U.S. PATENT DOCUMENTS

| 9,973,039 B2 | 5/2018 | Morreale et al. |
| 2008/0180564 A1 | 7/2008 | Yamaji |

(Continued)

FOREIGN PATENT DOCUMENTS

| CN | 101147308 A | 3/2008 |
| CN | 102696164 A | 9/2012 |

(Continued)

OTHER PUBLICATIONS

Chinese Office Action dated May 6, 2020, Chinese Patent Application No. 201910345944.5.
(Continued)

*Primary Examiner* — Eric D Lee
(74) *Attorney, Agent, or Firm* — Vierra Magen Marcus LLP

(57) ABSTRACT

Described herein is an apparatus having a wireless power receiver comprising a receiver coil used to receive power wirelessly and to communicate wirelessly. The wireless power receiver outputs power to a bus based on the wirelessly received power. The apparatus has an open-loop DC-DC converter and a linear regulator. The apparatus has a controller configured to enable the open-loop DC-DC converter to use the power on the bus to charge a battery. The controller is further configured to control the linear regulator to stabilize a current in the bus at the output of the wireless power receiver to reduce interference to the wireless communication when using the receiver coil to wirelessly communicate from the wireless power receiver to the transmitter of the power while the open-loop DC-DC converter is being used to charge the battery.

20 Claims, 17 Drawing Sheets

Related U.S. Application Data

(60) Provisional application No. 62/724,407, filed on Aug. 29, 2018.

(51) Int. Cl.
*H04B 5/00* (2006.01)
*H02J 50/12* (2016.01)

(58) Field of Classification Search
USPC .......................................................... 320/108
See application file for complete search history.

(56) References Cited

U.S. PATENT DOCUMENTS

| | | | |
|---|---|---|---|
| 2009/0230934 | A1 | 9/2009 | Hooijschuur et al. |
| 2009/0261778 | A1 | 10/2009 | Kook |
| 2012/0223674 | A1 | 9/2012 | Choi et al. |
| 2014/0038522 | A1 | 2/2014 | Novak, III et al. |
| 2014/0070773 | A1 | 3/2014 | Cottrill et al. |
| 2015/0054351 | A1 | 2/2015 | Deguchi et al. |
| 2016/0056664 | A1 | 2/2016 | Partovi |
| 2016/0072310 | A1 | 3/2016 | Lisuwandi |
| 2018/0013303 | A1 | 1/2018 | Wu et al. |
| 2018/0115157 | A1 | 4/2018 | Chan et al. |
| 2018/0309315 | A1* | 10/2018 | Der .................. H02J 7/007192 |
| 2019/0305560 | A1* | 10/2019 | Wang .................... H02M 7/49 |
| 2020/0044482 | A1 | 2/2020 | Partovi et al. |

FOREIGN PATENT DOCUMENTS

| | | |
|---|---|---|
| CN | 105207687 A | 12/2015 |
| CN | 107317382 A | 11/2017 |
| CN | 107769399 A | 3/2018 |
| CN | 107979152 A | 5/2018 |
| CN | 207339384 U | 5/2018 |
| CN | 108183559 A | 6/2018 |
| CN | 207625303 U | 7/2018 |
| WO | 2009112900 A1 | 9/2009 |

OTHER PUBLICATIONS

Non-Final Office Action dated Apr. 28, 2021, U.S. Appl. No. 16/555,829, filed Aug. 29, 2019.
Response to Office Action dated Jul. 28, 2021, U.S. Appl. No. 16/555,829, filed Aug. 29, 2019.
International Search Report dated Jun. 28, 2019, in PCT Patent application No. PCT/CN2019/048617, 9 pages.
U.S. Appl. No. 16/555,829, filed Aug. 29, 2019.
International Search Report dated Aug. 8, 2019, in PCT Patent Application No. PCT/CN2019/084571, 9 pages.
Notice of Allowance dated Aug. 12, 2021, U.S. Appl. No. 16/555,829, filed Aug. 29, 2019.
Notice of Allowance dated Jul. 24, 2020, Chinese Patent Application No. 201910345944.5.
Extended European Search Report dated Sep. 24, 2021, European Patent Application No. 19854219.3-1202.

* cited by examiner

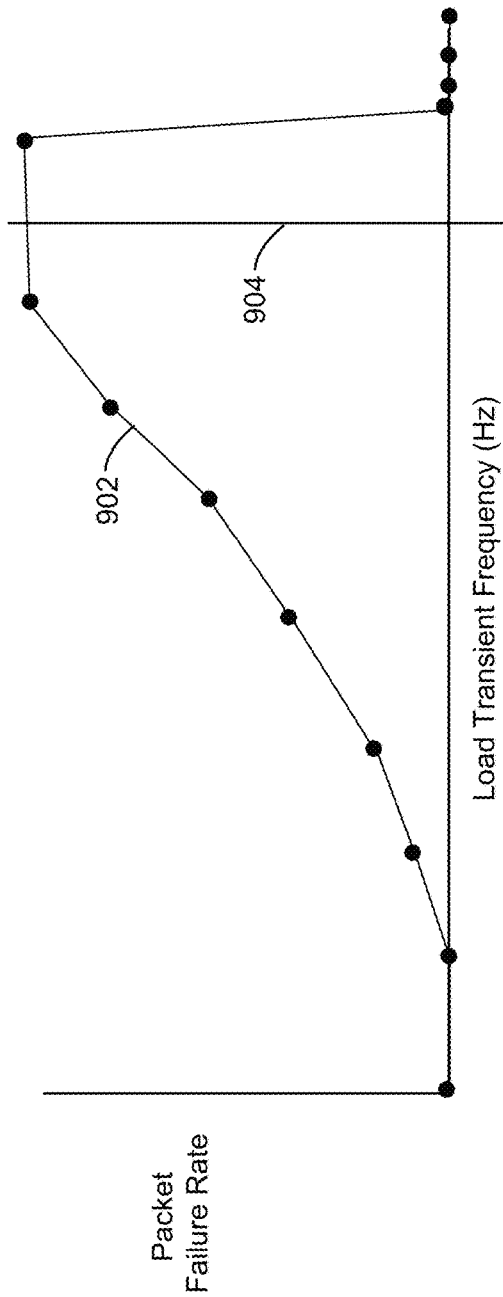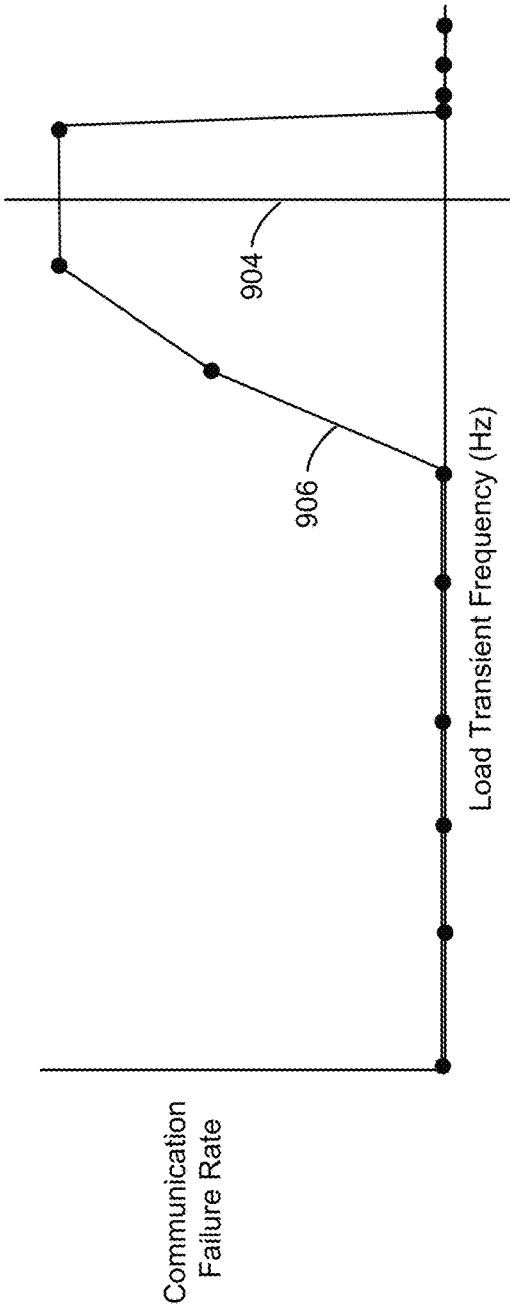

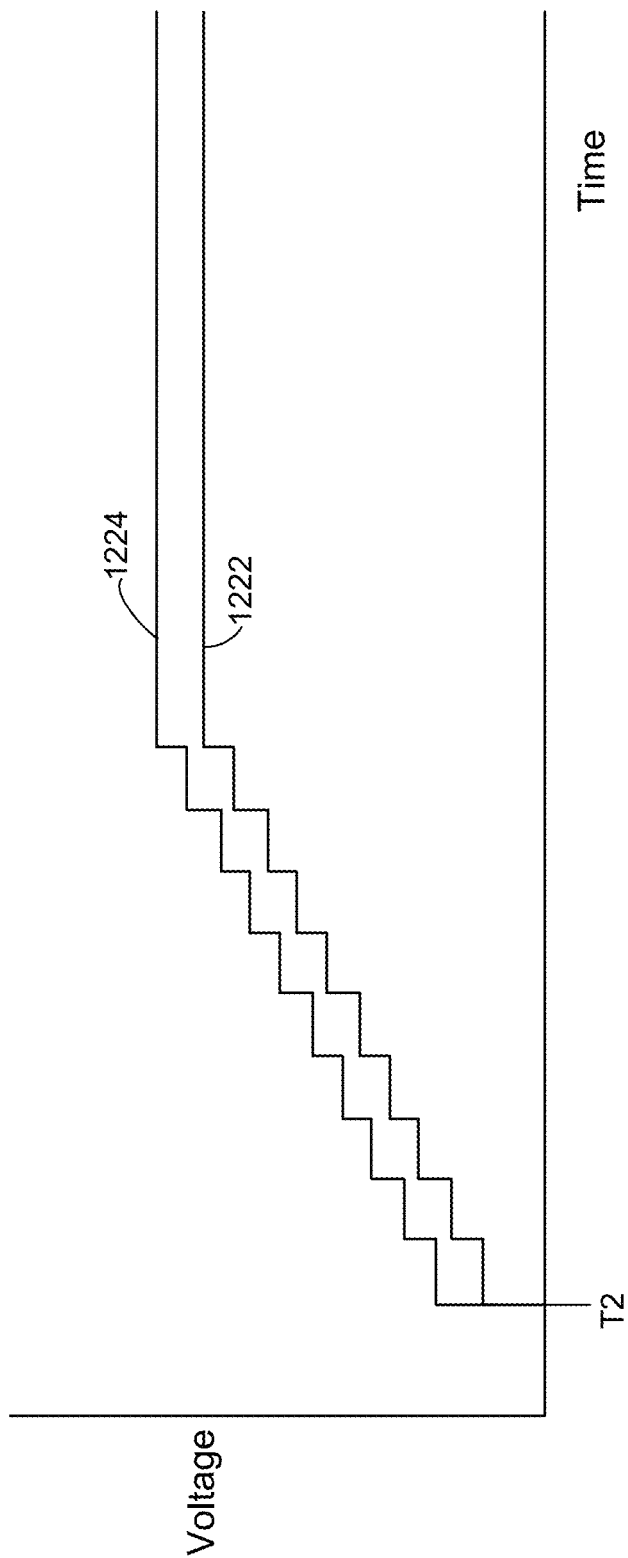

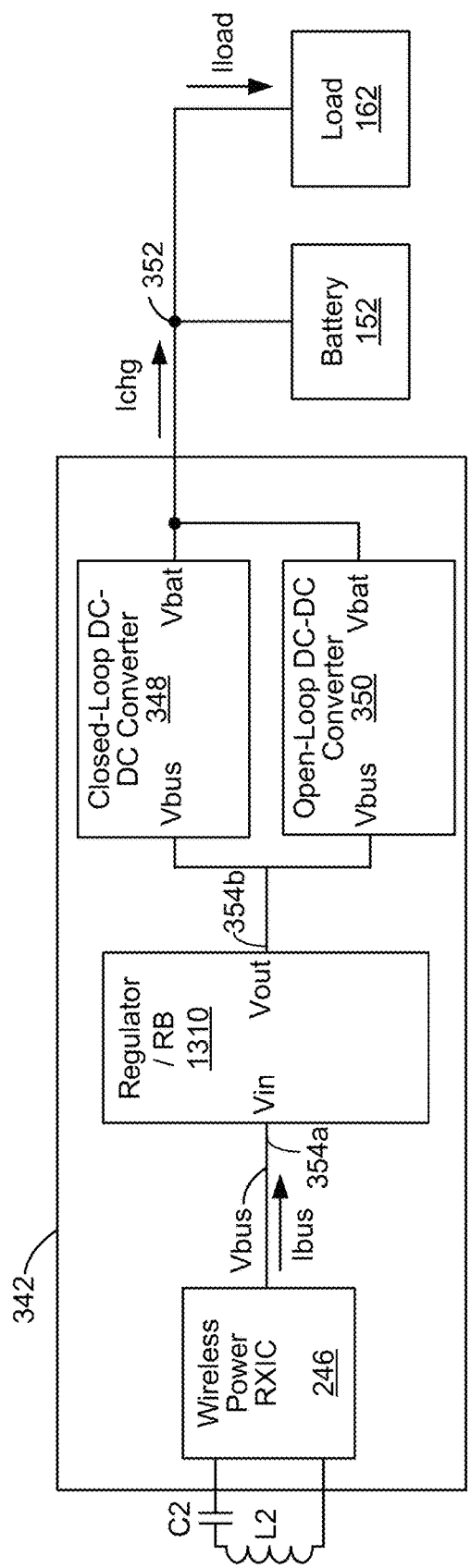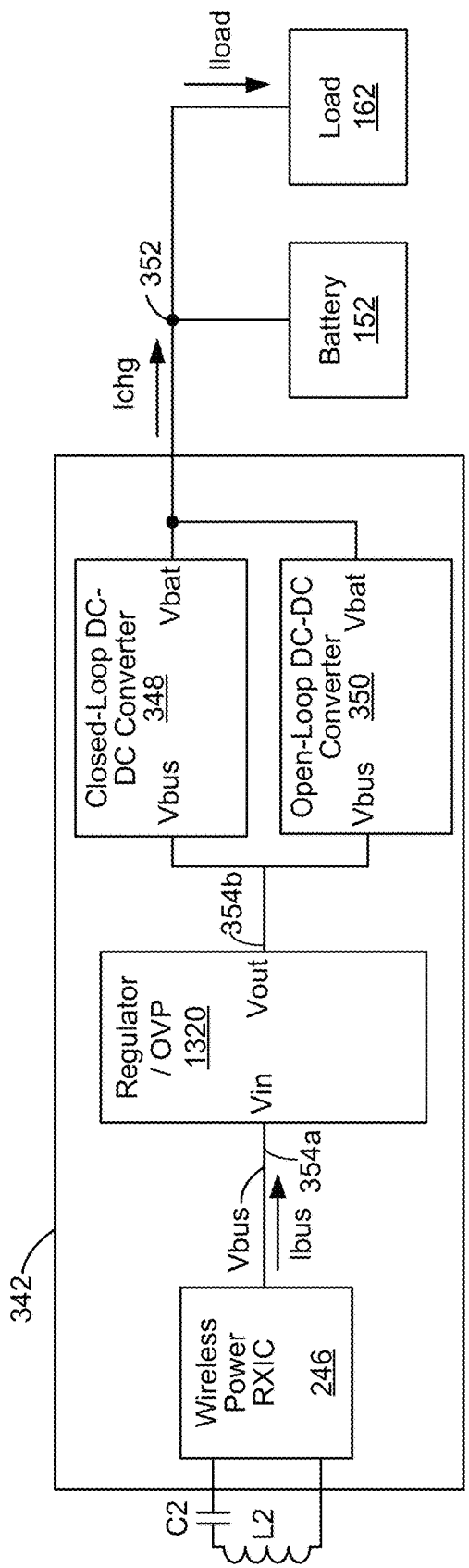

IN-BAND COMMUNICATION DURING WIRELESS BATTERY CHARGING

PRIORITY CLAIM

This application is a continuation of PCT Patent Application No. PCT/CN2019/084571, filed Apr. 26, 2019 by Mao et al., entitled "IN-BAND COMMUNICATION DURING WIRELESS BATTERY CHARGING, which claims priority to U.S. Provisional Patent Application No. 62/724,407 filed Aug. 29, 2018 by Mao et al., entitled "IN-BAND COMMUNICATION DURING WIRELESS BATTERY CHARGING," both of which are incorporated by reference herein in their entirety.

This application claims priority to U.S. Provisional Patent Application No. 62/724,407 filed Aug. 29, 2018 by Mao et al., entitled "IN-BAND COMMUNICATION DURING WIRELESS BATTERY CHARGING," which is incorporated by reference herein in its entirety.

TECHNICAL FIELD

The disclosure generally relates to wireless battery charging systems and methods for use therewith.

BACKGROUND

In a typical Qi-standard wireless battery charging system, an adapter converts power from an AC voltage to a DC voltage and supplies the DC voltage to a wireless power transmitter (TX). The wireless power TX transmits power wirelessly via an inductive coupling to a wireless power receiver (RX), which rectifies the power and supplies a DC voltage to a charger. The charger charges a rechargeable battery with a regulated current or voltage.

Communications are used to control the system's operation. In the Qi-standard, which was developed by the Wireless Power Consortium (WPC), communication from the wireless power RX to the wireless power TX is accomplished by modulating a load seen by a coil of the wireless power RX, and communication from the wireless power TX to the wireless power RX is accomplished by modulating the frequency of the transmitted power signal. Both of the aforementioned types of communications are in-band communications. The communication between the wireless power TX and the adapter can be, for example, through wires in a universal serial bus (USB) cable.

SUMMARY

According to a first aspect of the present disclosure, an apparatus for charging a battery using wirelessly received power is provided. The apparatus comprises a wireless power receiver (RX) comprising a receiver coil. The wireless power RX is configured to use the receiver coil to receive power wirelessly and to communicate wirelessly to a transmitter of the power. The wireless power RX has an output configured to output power to a bus based on the wirelessly received power. The apparatus has an open-loop DC-DC converter having an input coupled to the bus and an output coupled to a terminal configured to be coupled to the battery. The apparatus has a linear regulator connected along an electrical power pathway from the output of the wireless power RX to the terminal. The electrical power pathway has a portion that passes from the input of the open-loop DC-DC converter to the output of the open-loop DC-DC converter. The apparatus has a controller configured to enable the open-loop DC-DC converter to use the power output to the bus by the wireless power RX to charge the battery. The controller is further configured to control the linear regulator to stabilize a current in the bus at the output of the wireless power RX to reduce interference to the wireless communication when using the receiver coil to wirelessly communicate from the wireless power RX to the transmitter of the power while the open-loop DC-DC converter is being used to charge the battery.

Optionally, in a second aspect and in furtherance of the first aspect, the controller is configured to operate the linear regulator in a mode in which the linear regulator does not actively limit a current in the linear regulator unless a load powered by the battery draws a transient current while the open-loop DC-DC converter is being used to charge the battery.

Optionally, in a third aspect and in furtherance of the first or second aspects, the controller is configured to operate the linear regulator in a mode in which the linear regulator actively limits a current in the linear regulator whether or not a load powered by the battery draws a transient current while the open-loop DC-DC converter is being used to charge the battery.

Optionally, in a fourth aspect and in furtherance of any of the first to third aspects, the controller is configured to control the linear regulator based on a target current for charging the battery with the open-loop DC-DC converter.

Optionally, in a fifth aspect and in furtherance of any of the first to fourth aspects, the linear regulator is between the output of the wireless power RX and the input of the open-loop DC-DC converter.

Optionally, in a sixth aspect and in furtherance of any of the first to fourth aspects, the linear regulator is between the output of the open-loop DC-DC converter and the terminal configured to be coupled to the battery.

Optionally, in a seventh aspect and in furtherance of any of the first to sixth aspects, the linear regulator is integrated with reverse current protection block for the electrical power pathway.

Optionally, in an eighth aspect and in furtherance of any of the first to sixth aspects, the linear regulator is configured to provide over-voltage protection.

Optionally, in a ninth aspect and in furtherance of any of the first to eighth aspects, the apparatus further comprises a closed-loop DC-DC converter having an input coupled to the bus and an output configured to be coupled to the terminal that is configured to be coupled to the battery. The electrical power pathway is a first electrical power pathway. The closed-loop DC-DC converter is along a second electrical power pathway from the output of the wireless power RX to the terminal. The controller is further configured to selectively enable one of the closed-loop DC-DC converter or the open-loop DC-DC converter at a time to use the power output from the wireless power RX to the bus to charge the battery.

Optionally, in a tenth aspect and in furtherance of the ninth aspect, the controller is further configured to enable the closed-loop DC-DC converter and disable the open-loop DC-DC converter during a constant current closed-loop DC-DC converter phase and a constant voltage closed-loop DC-DC converter phase to charge the battery. The controller is further configured to enable the open-loop DC-DC converter and disable the closed-loop DC-DC converter during a constant current open-loop DC-DC converter phase and a constant voltage open-loop DC-DC converter to charge the battery.

Optionally, in an eleventh aspect and in furtherance of any of the first to tenth aspects, the controller is further configured to control the linear regulator to stabilize a voltage at the bus at the output of the wireless power RX to reduce the interference to the communication.

According to one other aspect of the present disclosure, a method is provided for charging a battery using wirelessly received power. The method comprises using a receiver coil to receive power wirelessly at a wireless power receiver (RX). The method comprises outputting power from an output of the wireless power RX to a bus based on the wirelessly received power. The method comprises using the receiver coil to wirelessly communicate from the wireless power RX to a transmitter of the wireless power. The method comprises enabling an open-loop DC-DC converter having an input coupled to the bus and an output coupled to a terminal configured to be coupled to a battery to use the power output to the bus by the wireless power RX to charge the battery. The method comprises controlling a linear regulator that is connected in an electrical power pathway from the output of the wireless power RX to the terminal to stabilize a current in the bus at the output of the wireless power RX to reduce interference to the wireless communication when using the receiver coil to wirelessly communicate from the wireless power RX to the transmitter while the open-loop DC-DC converter is being used to charge the battery. The electrical power pathway has a portion that passes from the input of the open-loop DC-DC converter to the output of the open-loop DC-DC converter.

According to one other aspect of the present disclosure, an apparatus for charging a battery using wirelessly received power is provided. The apparatus comprises a power bus and a wireless power receiver (RX) comprising a receiver coil. The wireless power RX is configured to use the receiver coil to receive power wirelessly and to communicate wirelessly to a transmitter of the power. The wireless power receiver is configured to output direct current (DC) power to the power bus based on the wirelessly received power. The apparatus comprises a closed-loop DC-DC converter having an input coupled to the power bus and an output configured to be coupled to the battery. The apparatus comprises an open-loop DC-DC converter having an input coupled to the power bus and an output configured to be coupled to the battery. The apparatus comprises a linear regulator coupled serially with the open-loop DC-DC converter. The apparatus comprises a controller configured to selectively enable one of the closed-loop DC-DC converter or the open-loop DC-DC converter at a time to use the DC power output to the bus by the wireless power RX to charge the battery. The controller is further configured to control the linear regulator to stabilize a current on the bus at the output of the wireless power RX to reduce interference to the wireless communication caused by transient load current when using the receiver coil to wirelessly communicate from the wireless power RX to the transmitter of the power while the open-loop DC-DC converter is being used to charge the battery.

According to one other aspect of the present disclosure, a method of charging a battery using wirelessly received power is provided. The method comprises using a receiver coil to receive power wirelessly at a wireless power receiver (RX), outputting direct current (DC) power to a power bus at an output of the wireless power RX based on the wirelessly received power, using the receiver coil to wirelessly communicate from the wireless power RX to a transmitter of the wireless power, selectively enabling one of a closed-loop DC-DC converter or an open-loop DC-DC converter at a time to use the DC power output to the power bus by the wireless power RX to charge a battery that is coupled to an output of the closed-loop DC-DC converter and an output of the open-loop DC-DC converter, and controlling a linear regulator that is coupled serially with the open-loop DC-DC converter to stabilize a current on the power bus at the output of the wireless power RX to reduce interference to the wireless communication caused by transient load current when using the receiver coil to wirelessly communicate from the wireless power RX to the transmitter while the open-loop DC-DC converter is being used to charge the battery.

According to one other aspect of the present disclosure, a wireless electronic device is provided. The wireless electronic device comprises a power bus, and a wireless power receiver (RX) comprising a receiver coil. The wireless power RX is configured to use the receiver coil to receive power wirelessly, use the receiver coil to communicate wirelessly to a transmitter of the wireless power, and output direct current (DC) power to the power bus based on the wirelessly received power. The wireless electronic device comprises a closed-loop DC-DC converter having an input coupled to the power bus and an output coupled to a battery in the wireless electronic device. The wireless electronic device comprises an open-loop DC-DC converter having an input coupled to the power bus and an output coupled to the battery. The wireless electronic device comprises a linear regulator coupled serially with the open-loop DC-DC converter. The wireless electronic device comprises electronic components configured to draw current from the battery and from the output of the open-loop DC-DC converter when the open-loop DC-DC converter is being used to charge the battery. The wireless electronic device comprises a controller configured to selectively enable one of the closed-loop DC-DC converter or the open-loop DC-DC converter at a time to use the DC power on the power bus to charge the battery. The controller is further configured to control the linear regulator to stabilize a current and/or voltage on the power bus at the output of the wireless power RX to reduce interference from the electronic components drawing current from the battery when using the receiver coil to communicate wirelessly while the open-loop DC-DC converter is being used to charge the battery.

Embodiments of the present technology described herein provide improvements to existing wireless battery charging systems. Such embodiments can be used to reduce or eliminate interference with wireless communication from a wireless power RX to a transmitter of the wireless power. The interference may be due to transient currents drawn by a load powered by the battery. Such transient currents can create load variation on the wireless power RX, which can interfere with the wireless communication while the open-loop DC-DC converter is being used to charge the battery. Embodiments reduce or eliminate interference to the wireless communication caused by transient load currents while an open-loop DC-DC converter is being used to charge a battery.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIGS. 9A and 9B are graphs to illustrate how transient currents drawn by the load may impact wireless communication when using the system of FIG. 7.

FIG. 12B is a graph that depicts one embodiment of operating the linear regulator in a mode in which the linear regulator does actively limit a current whether or not the load draws a transient current.

FIG. 13A depicts one embodiment in which the wireless power RX and charger has a linear regulator/ARC that provides for ARC protection.

FIG. 13B depicts one embodiment in which the wireless power RX and charger has a linear regulator/OVP that provides for OVP.

DETAILED DESCRIPTION

The present disclosure will now be described with reference to the figures, which in general relate to wireless battery charging systems for wirelessly charging a rechargeable battery of an electronic device that includes a load powered by the battery, and methods for use therewith.

Figure 1:
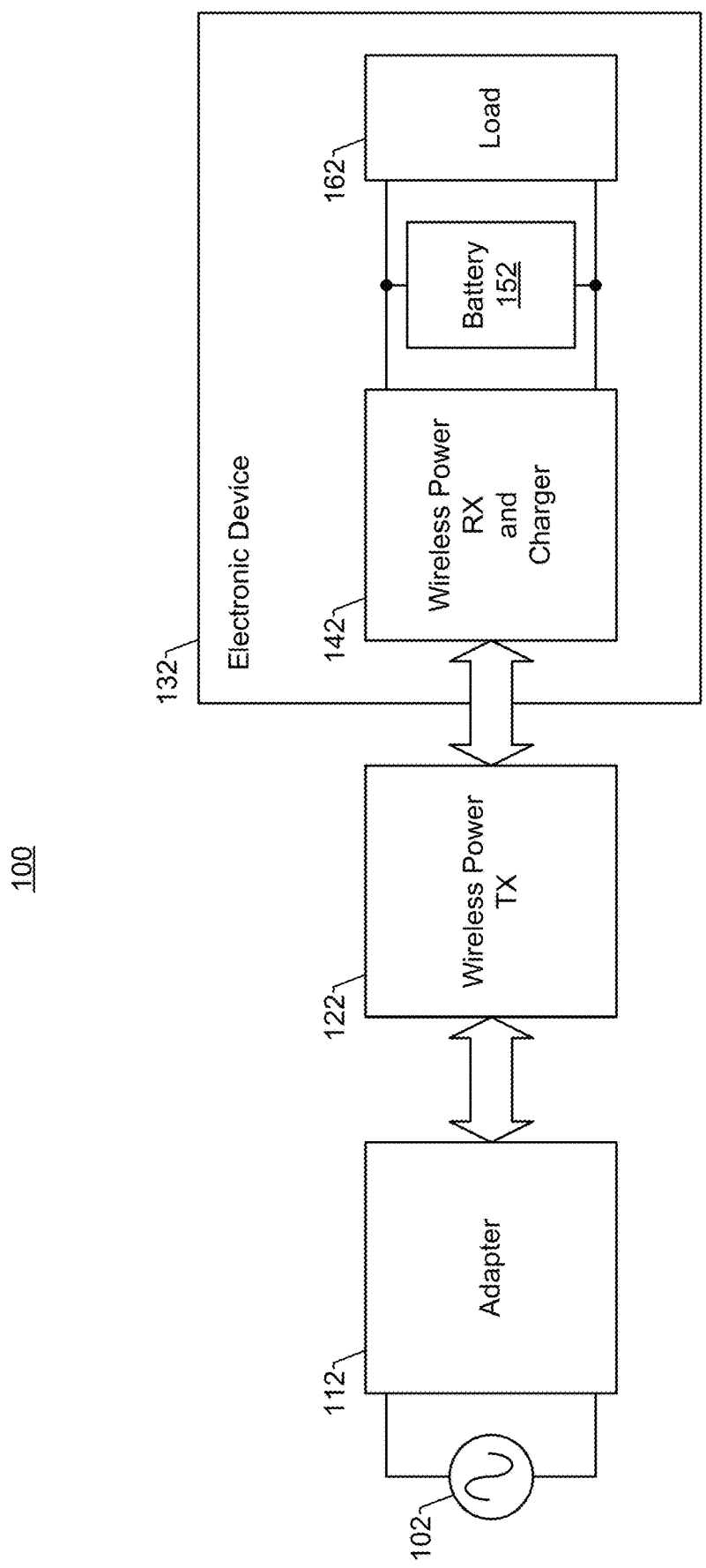
FIG. 1 illustrates an example wireless battery charging system.

FIG. 1 illustrates an example wireless battery charging system 100, which can be a Qi-standard wireless battery charging system, but is not limited thereto. The Qi-standard is an open interface standard developed by the Wireless Power Consortium (WPC) that defines wireless power transfer using inductive charging over distances of up to 4 cm (1.6 inches). A Qi-standard wireless battery charging system typically uses a charging pad and a compatible battery powered device, which is placed on top of the pad, charging via resonant inductive coupling.

Referring to FIG. 1, the example wireless battery charging system 100 is shown as including an adaptor 112, a wireless power transmitter (TX) 122, and a wireless power receiver (RX) and charger 142. As can be appreciated from FIG. 1, the wireless power RX and charger 142 is shown as being part of an electronic device 132 that also includes a rechargeable battery 152 and a load 162 that is powered by the battery 152. Since the electronic device 132 is powered by a battery, the electronic device 132 can also be referred to as a battery-powered device 132. The load 162 can include, e.g., one or more processors, displays, transceivers, and/or the like, depending upon the type of the electronic device 132. The electronic device 132 can be, for example, a mobile smartphone, a tablet computer, or a notebook computer, but is not limited thereto. The battery 152, e.g., a lithium ion battery, can include one or more electrochemical cells with external connections provided to power the load 162 of the electronic device 132.

The adaptor 112 converts an alternating current (AC) voltage, received from an AC power supply 102, into a direct current (DC) input voltage (Vin). The AC power supply 102 can be provided by a wall socket or outlet or by a power generator, but is not limited thereto. The wireless power TX 122 accepts the input voltage (Vin) from the adaptor 112 and in dependence thereon transmits power wirelessly to the wireless power RX and charger 142. The wireless power TX 122 can be electrically coupled to the adaptor 112 via a cable that includes a plurality of wires, one or more of which can be used to provide the input voltage (Vin) from the adaptor 112 to the wireless power TX 122, and one or more of which can provide a communication channel between the adaptor 112 and the wireless power TX 122. The communication channel can allow for wired bi-directional communication between the adaptor 112 and the wireless power TX 122. The cable that electrically couples the adaptor 112 to the wireless power TX 122 can include a ground wire that provides for a common ground (GND). The cable between the adaptor 112 and the wireless power TX 122 is generally represented in FIG. 1 by a double-sided arrow extending between the adaptor 112 and the wireless power TX 122. Such a cable can be, e.g., a universal serial bus (USB) cable, but is not limited thereto.

The wireless power RX and charger 142, via an inductive coupling, receives power wirelessly from the wireless power TX 122 and uses the received power to charge the battery 152. The wireless power RX and charger 142 can also wirelessly communicate bi-directionally with the wireless power TX 122 using in-band communications defined by the Qi standard. In FIG. 1 a double-sided arrow extending between the wireless power TX 122 and the wireless power RX and charger 142 is used to generally represent the wireless transfer of power and communications therebetween.

Figure 2:
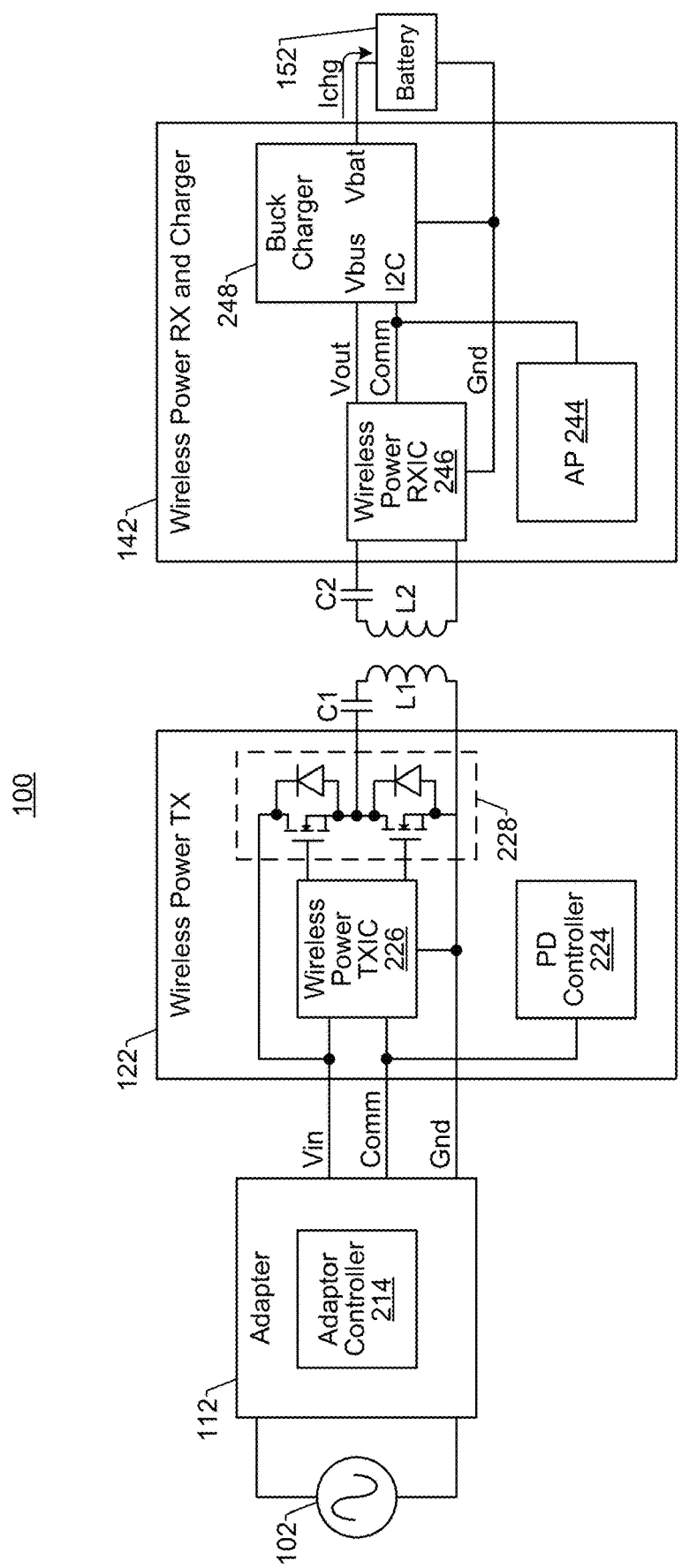
FIG. 2 illustrates additional details of the example wireless battery charging system introduced in FIG. 1.

FIG. 2 illustrates additional details of the wireless battery charging system 100 introduced in FIG. 1. To make FIG. 2 less crowded, the load 162 that is powered by the battery 152 is not shown, and the electronic device 132 within which the wireless power RX and charger 142 is included is not shown. Referring to FIG. 2, the adaptor 112 is shown as including an adaptor controller 214. The adaptor 112 can include an AC/DC converter (not specifically shown) that converts the AC voltage provided by the power supply 102 to the DC input voltage (Vin) that is provided by the adaptor 112 to the wireless power TX 122. Such an AC/DC converter can be or include a full-wave rectifier, for example, but is not limited thereto. The adaptor controller 214 can include, e.g., a processor and a transceiver that sends and receives communication signals to and from the wireless power TX 122.

In FIG. 2, the wireless power TX 122 is shown as including a power delivery (PD) controller 224, a wireless power transmitter integrated circuit (TXIC) 226, and a half-bridge inverter 228. The half-bridge inverter 228 is shown as being connected between a high voltage rail (that is at the input voltage (Vin)) and ground (GND). The PD controller 224 can include, e.g., a processor and a transceiver that sends and receives wireless communication signals to and from the adaptor 112. The function of the PD controller can sometimes be integrated into the TXIC 226. The wireless power TXIC 226 is shown as accepting the input voltage (Vin) from the adaptor 112 and controlling switches (S1 and S2) of the half-bridge inverter 228. The switches S1 and S2 are opened and closed at a desired frequency to generate an alternating signal at an output between the switches. The output of the inverter 228 is connected to an inductor L1 through a resonance capacitor C1. Since the inductor L1 functions as a transmitter coil, the inductor L1 can also be referred to as a transmitter coil. A full-bridge inverter that includes four switches can be used in place of the half-bridge inverter 228, as is known in the art. Other variations are also possible, as known in the art. The TXIC can include e.g. a processor and a transceiver that sends and receives communication signals to and from the wireless power RXIC and charger 142.

Still referring to FIG. 2, the wireless power RX and charger 142 is shown as including an application processor (AP) 244, a wireless power receiver integrated circuit (RXIC) 246, and a buck charger 248. The wireless power RXIC 246 is connected to an inductor L2 through a resonance capacitor C2. Since the inductor L2 functions as a receiver coil, the inductor L2 can also be referred to as a receiver coil. The inductors L1 and L2 provide for an inductive coupling between the wireless power RX 122 and the wireless power RX and charger 142, and more specifically, between the wireless power TXIC 226 and the wireless power RXIC 246. The inductive coupling can be used to transfer power from the wireless power TX 122 to the wireless power RX and charger 142, as well as to provide in-band bidirectional wireless communications therebetween. In the embodiment shown, power is wirelessly transferred from the wireless power TXIC 226 to the wireless power RXIC 246 using a single transmitter coil, but can alternatively be wirelessly transferred using more than one transmitter coil. Similarly, it is also possible that more than one receiver coil be used to wirelessly receive power at the receiving side of the inductive coupling. Other variations are also possible, as known in the art.

The wireless power RXIC 246 converts the AC voltage provided to it by the inductor L2 to a DC output voltage (Vout). The DC output voltage (Vout) is provided to the buck charger 248. The buck charger 248 can step down the output voltage (Vout) to an appropriate battery charging voltage (Vbat) that is used to charge the battery 152. For example, Vout may be 10 Volts (V), and Vbat may be 4.2V. For another example, Vout may be 10V, and Vbat may be 3.5V. These are just a few examples which are not intended to be limiting, as Vout and Vbat can have a myriad of different values. It would also be possible that the buck charger can step up the output voltage (Vout) i.e. working as a boost charger, or maintain the output voltage (Vout) so that the battery charging voltage (Vbat) is the same as Vout in alternative embodiments.

The buck charger 248, which can also be referred to as a buck converter, is an example of a closed-loop charger, in that the voltage and/or current at its output (i.e., at the terminal that produces Vbat, which terminal can be referred to as the Vbat terminal) is adjusted based on feedback produced by the buck charger 248 itself. The AP 244, which can also be referred to as a controller, can send and receive communication signals to and from the wireless power RXIC 246 and the buck charger 248. In certain embodiments, the AP 244 can utilize Inter-Integrated Circuit (I2C) serial bus communications to communicate with the wireless power RXIC 246 and the buck charger 248, however other communication interfaces and protocols can alternatively be used. The AP 244 can be, e.g., a processor of the electronic device 132, which processor can also be used to run applications, control communications, and the like, but is not limited thereto. It is also possible that the wireless power RX and charger 142 includes a controller, e.g., a PD controller, dedicated to controlling battery charging.

The buck charger 248 is shown as including a voltage input terminal, labeled Vbus, and a voltage output terminal, labeled Vbat. The voltage output terminal (labeled Vbat) is shown as being connected to a terminal of the rechargeable battery 152, which can also be referred to herein more succinctly as the battery 152. The buck charger 248 can charge the rechargeable battery 152 with a regulated current or voltage.

As noted above, a buck charger (e.g., 248) typically has a maximum efficiency of low 90 s percent, which results in wasted energy. This wasted energy can cause the heating-up of the battery powered device (e.g., 132), such as a mobile smartphone, within which the buck charger is located, which is undesirable. Additionally, this inefficiency causes charging to take longer than it would otherwise take if the efficiency were higher.

Certain embodiments of the present technology, described below, can be used to increase the overall efficiency of a wireless battery charging system. Such embodiments are beneficial because they can reduce the wasted energy and thereby reduce the heating-up of the battery powered device (e.g., 132), such as a mobile smartphone, within which the buck charger is located. Additionally, such embodiments can reduce how long it takes to fully charge a battery (e.g., 152).

Figure 3:
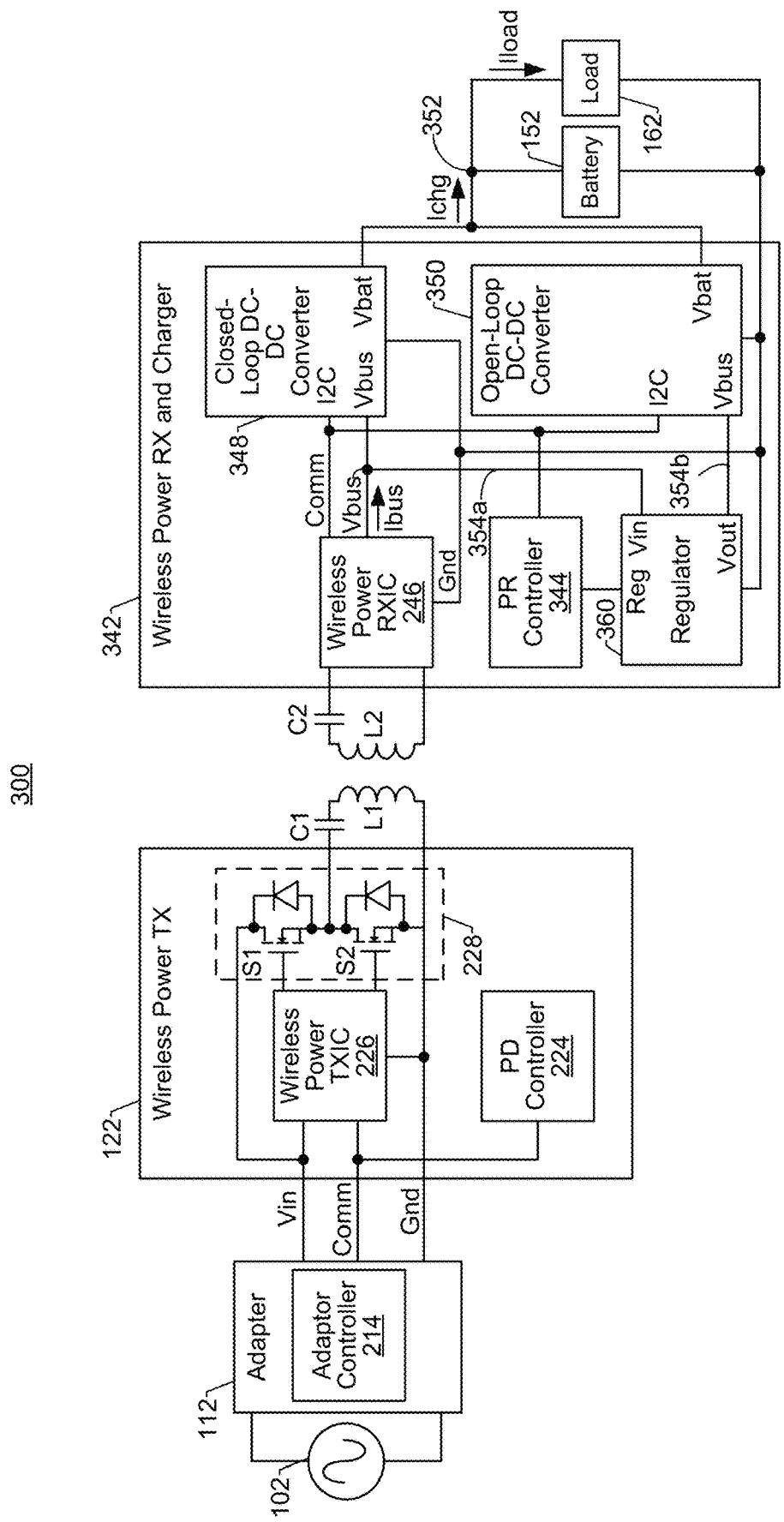
FIG. 3 illustrates a wireless battery charging system according to an embodiment of the present technology.

FIG. 3 illustrates a wireless battery charging system 300 according to an embodiment of the present technology. Elements in FIG. 3 that are the same or similar to those already discussed above with reference to FIGS. 1 and 2 are labeled the same and in certain instances are not discussed in detail because reference can be made to the above discussions of FIGS. 1 and 2.

Referring to FIG. 3, the example wireless battery charging system 300 is shown as including an adaptor 112, a wireless power TX 122, and a wireless power RX and charger 342. The wireless power RX and charger 342 can be included within an electronic device (e.g., a mobile smartphone, a tablet computer, or a notebook computer, but not limited thereto) that also includes a rechargeable battery 152 and a load 162 that is powered by the battery 152. The adaptor 112 includes an adaptor controller 214, and can include an AC/DC converter (not specifically shown) that converts the AC voltage provided by the power supply 102 to the DC input voltage (Vin) that is provided by the adaptor 112 to the wireless power TX 122. The adaptor controller 214 can include, e.g., a processor and a transceiver that sends and receives communication signals to and from the wireless power TX 122.

The wireless power TX 122 includes a PD controller 224, a wireless power TXIC 226, and an inverter 228. The PD controller 224 can include, e.g., a processor and a transceiver that sends and receives wireless communication signals to and from the adaptor 112. The wireless power TXIC 226 can accept the input voltage (Vin) from the adaptor 112 and controls switches (S1 and S2) of the inverter 228 to generate an alternating signal at an output thereof. Alternatively, a further DC-DC converter can be located between the adaptor 112 and the wireless power TX 122, the adaptor 112 can output a fixed DC voltage, and the further DC-DC converter can be controlled to adjust the input voltage (Vin) that is provided to the wireless power TX 122. The output of the inverter 228 is connected to the inductor L1 (which can also be referred to as a transmitter coil) through the resonance capacitor C1. A full-bridge inverter that includes four switches can be used in place of the half-bridge inverter 228, as is known in the art. Other variations are also possible, as known in the art.

Still referring to FIG. 3, the wireless power RX and charger 342 is shown as including a power receiver (PR) controller 344, a wireless power RXIC 246, a closed-loop DC-DC converter 348, an open-loop DC-DC converter 350, and a linear regulator 360. In FIG. 3, the wireless power RXIC 246 is connected to the inductor L2 (which can also be referred to as a receiver coil) through the resonance capacitor C2. The inductors L1 and L2 provide for an inductive coupling between the wireless power TXIC 226 and the wireless power RXIC 246, which inductive coupling is used to transfer power from the wireless power TX 122 to the wireless power RX and charger 342, as well as to prove wireless bidirectional communications therebetween. Based on the power that is received by the wireless power RXIC 246, the wireless power RXIC 246 outputs power to a power bus 354a. The wireless power RXIC 246 outputs a DC voltage (Vbus) and a DC current (Ibus) to the power bus 354a. In the embodiment shown, power is wirelessly transferred from the wireless power TXIC 226 to the wireless power RXIC 246 using a single transmitter coil, but can alternatively be wirelessly transferred using more than one transmitter coil. Similarly, it is also possible that more than one receiving coil be used to wirelessly receive power at the receiving side of the inductive coupling. Other variations are also possible, as known in the art.

Using the receiver coil L2 for communicating between the wireless power TXIC 226 and the wireless power RXIC 246 is referred to as in-band communication, as the receiver coil L2 is also used for receiving electrical power from the wireless power TXIC 226. Embodiments disclosed herein improve in-band communication. In particular, in-band communication from the wireless power RXIC 246 to the wireless power TXIC 226 is improved by controlling the regulator 360 when the open-loop DC-DC converter 350 is being used to charge the battery 152, in embodiments.

In one embodiment, the closed-loop DC-DC converter 348 is a buck charger. In one embodiment, the closed-loop DC-DC converter 348 is a boost charger. In one embodiment, the closed-loop DC-DC converter 348 is a buck-boost charger. In one embodiment, the open-loop DC-DC converter 350 is a switched capacitor charger. In one embodiment, the open-loop DC-DC converter 350 is a load switch charger. In one embodiment, the open-loop DC-DC converter 350 is a flash charging charger. The inclusion and selective use of the open-loop DC-DC converter 350 increases the overall efficiency of the wireless battery charging system 300, which effectively reduces the heating-up of the battery powered device (within which the DC-DC converters 348 and 350 are located), and effectively reduces the total amount of time it takes to fully recharge a rechargeable battery (e.g., 152). For example, a typical switched capacitor charger (e.g., 350) has an efficiency of 97%, which is more efficient than a typical buck charger (e.g., 348).

In accordance with certain embodiments of the present technology, during any given phase of a battery charging process (also referred to as a charging profile), only one of the two chargers 348 and 350 operates. For the closed-loop DC-DC converter 348 (e.g., buck converter) the voltage and/or current at its output (i.e., at the Vbat terminal) is adjusted based on feedback produced by the closed-loop DC-DC converter 348 itself. By contrast, for the open-loop DC-DC converter 350, the voltage and/or current at its output (i.e., at the Vbat terminal) is not adjusted based on feedback produced by the open-loop DC-DC converter 350 itself. The closed-loop DC-DC converter 348 may have better current and voltage regulation, and may be employed during low power charging phases. The open-loop DC-DC converter 350 does not have current and voltage regulation, and may be employed during high power charging phases. It is noted the term Vbat is used both to refer to the output terminal of a DC-DC converter (348 and 350), as well as the battery charging voltage output at that terminal, and the specific use of the term can be understood from the context of how the term is used.

The PR controller 344 is used to control the system 300 when the open-loop DC-DC converter 350 is used to charge the battery 152, in some embodiments. When the open-loop DC-DC converter 350 operates, the PR controller 344 controls the overall wireless battery charging system to operate in a closed-loop mode. In some embodiments, the PR controller 344 regulates a battery charging current (Ichg) or charging voltage when the open-loop DC-DC converter 350 is used. In a constant current charging state, the PR controller 344 regulates the battery charging current to follow a target value when the open-loop DC-DC converter 350 is used. In a constant voltage charging state, the PR controller 344 regulates the battery charging voltage to follow a target value when the open-loop DC-DC converter 350 is used. In some embodiments, the function of the PR controller 344 is realized within the AP (applications processor)

In one embodiment, the PR controller 344 instructs the wireless power RXIC 246 to communicate information to the wireless power TXIC 226 in order to operate the overall wireless battery charging system to operate in a closed-loop mode when the open-loop DC-DC converter 350 is used. As one example, the communication is used to establish a value for Vin at the input of the wireless power TXIC 226. The PR controller 344 may also regulate the voltage (Vbus) at the output of the wireless power RXIC 246. Note that if wireless communication between the wireless power RXIC 246 and wireless power TXIC 226 are compromised, then control of the open-loop DC-DC converter 350 may be compromised, as well. Embodiments disclosed herein prevent the load 162 from interfering with this wireless communication when the open-loop DC-DC converter 350 is used to charge the battery 152

The load 162 is depicted as drawing a load current (Iload). When the battery 152 is not being charged, the battery 152 provides the load current (Iload) to the load 162. When the open-loop DC-DC converter 350 is being used to charge the battery 152, the open-loop DC-DC converter 350 and/or the battery 152 may provide the load current (Iload) to the load 162. It is possible for transient currents drawn by the load 162 to interfere with the communication from the wireless power RXIC 246 to the wireless power TX 122 when the open-loop DC-DC converter 350 is charging the battery 152.

As will be described in additional detail below, the linear regulator 360 is used to reduce "load interference" with the communication from the wireless power RXIC 246 to the wireless power TXIC 226 when using the open-loop DC-DC converter 350 to charge the battery 152, in embodiments. The phrase "reduce load interference" includes complete elimination of load interference. The "load interference" refers to interference caused at least indirectly by transient current drawn by the load 162. In some embodiments, the linear regulator 360 is used to stabilize Ibus flowing in the power bus 354a at the output of the wireless power RXIC 246. In some embodiments, the linear regulator 360 is used to stabilize Vbus on the power bus 354a at the output of the wireless power RXIC 246. In some embodiments, the linear regulator 360 is used to stabilize both Ibus in the power bus 354a at the output of the wireless power RXIC 246 and Vbus on the power bus 354a at the output of the wireless power RXIC 246. Stabilizing Ibus and/or Vbus at the output of the wireless power RXIC 246 reduces or prevents load interference when using the receiver coil L2 to wirelessly communicate from the wireless power RXIC 246 to the wireless power TXIC 226 while the open-loop DC-DC converter 350 is being used to charge the battery 152. Stated another way, stabilizing Ibus and/or Vbus at the output of the wireless power RXIC 246 improves wireless communication using the receiver coil L2 while the open-loop DC-DC converter 350 is being used to charge the battery 152. Hence, in-band communication is improved.

The linear regulator 360 is a low dropout regulator, in one embodiment. The linear regulator 360 is a linear voltage regulator, in one embodiment. A linear voltage linear regulator may be used to maintain a constant voltage level at its input and/or output. In one embodiment, the linear regulator 360 comprises a MOSFET operated in the linear region. The linear regulator may be used to regulate current that passes through the linear regulator 360, in one embodiment. Hence, the linear regulator 360 may be referred to as a current regulator, in some embodiments.

The linear regulator 360 has an input (Vin), an output (Vout), and a regulating input (Reg). The linear regulator 360 is able to regulate a current in the linear regulator 360 by changing its internal resistance, which increases a voltage drop between Vin and Vout, in one embodiment. In one embodiment, when there is no dynamic load on the linear regulator 360, the regulation within the linear regulator 360 is inactive. When the linear regulator 360 is not actively regulating, the voltage drop between its input (Vin) and output (Vout) is very low, in one embodiment. When there is a dynamic load on the linear regulator 360 (such as from transient currents drawn by load 162), the output voltage of the linear regulator 360 may vary in time. The linear regulator 360 responds to the dynamic load by entering an active regulation mode, in one embodiment. When actively regulating, the voltage drop across the linear regulator 360 increases to counteract the variation of its output voltage, in one embodiment. The linear regulator 360 stabilizes the current and voltage at its input (Vin) when actively regulating, in one embodiment. Thus, the linear regulator 360 may prevent changes in voltage and/or current at its output (Vout) from propagating to its input (Vin), in one embodiment. Therefore, the linear regulator 360 may stabilize Ibus in the power bus 354a and/or Vbus on the power bus 354a at the output of the wireless power RXIC 246.

In one embodiment, the PR controller 344 is configured to operate the linear regulator 360 in a mode in which the linear regulator 360 does not actively limit a current in the linear regulator 360 unless the load 162 draws a transient current while the open-loop DC-DC converter 350 is being used to charge the battery 152.

In one embodiment, the linear regulator 360 regulates a current passing from the input (Vin) to the output (Vout) of the linear regulator 360 such that the current is not allowed to exceed a target current magnitude. The target current magnitude is near a target current magnitude for charging the battery 152 using the open-loop DC-DC converter 350, in one embodiment. The target current magnitude is slightly higher than the target current magnitude for charging the battery 152, in one embodiment. The PR controller 344 sends a signal to the linear regulator input (Reg) to establish the target current magnitude, in one embodiment. Note that preventing the current through the linear regulator 360 from exceeding the target current magnitude may also prevent the current (Ibus) in the power bus 354a at the output of the wireless power RXIC 246 from exceeding the target current magnitude, which is one technique for stabilizing Ibus in the power bus 354a at the output of the wireless power RXIC 246.

In one embodiment, the PR controller 344 is configured to operate the linear regulator 360 in a mode in which the linear regulator 360 actively limits a current in the linear regulator 360 whether or not the load 162 draws a transient current while the open-loop DC-DC converter 350 is being used to charge the battery 152. In one embodiment of this "active regulation mode," the voltage drop across the linear regulator 360 (between Vin and Vout) is about 50-100 millivolts. This voltage drop refers to the condition in which there is not a transient current being drawn by the load 162. When there is a transient current being drawn by the load 162, the voltage drop across the linear regulator 360 may decrease to counteract the transient current. Note that having 50-100 millivolts across the linear regulator 360 in the active regulation mode (without a transient current being drawn by the load 162) is one example. The voltage could be less than 50 millivolts or greater than 100 millivolts without a transient current being drawn by the load 162.

In one embodiment, to achieve this "active regulation mode," the PR controller 344 estimates a target voltage for the output of the regulator 360 based on a target battery voltage (Vbat), a target current at the input of the open-loop DC-DC converter 350 (e.g., open loop charger), and the equivalent impedance between the output of the regulator 360 and terminal 352. Then the PR controller 344 sets the target voltage as the target voltage for the regulator. The regulator 360 will adjust its internal impedance to maintain its output voltage as the set voltage target. The PR controller 344 then sets the output voltage for the RXIC 246 to be slightly higher (e.g. 50-100 millivolts higher) than the estimated target voltage set as regulation target voltage output of the regulator. The linear regulator 360 will then operate in the active regulation mode.

The linear regulator 360 is connected in an electrical power pathway that extends from the output of the wireless power RXIC 246 to the terminal 352 that is connected to the battery 152. The electrical power pathway is used to transfer DC power from the output of the wireless power RXIC 246 to the battery 152. The electrical power pathway comprises physical components and exists whether or not power is presently being transferred through the electrical power pathway. The electrical power pathway has a portion that passes from the input (Vbus) of the open-loop DC-DC converter 350 to the output (Vbat) of the open-loop DC-DC converter 350.

It may also be stated that the linear regulator 360 is coupled serially with the open-loop DC-DC converter 350. Being "coupled serially," as the term is used herein means that, when the open-loop DC-DC converter 350 is being used to charge the battery 152, there is either an electrical current pathway from the output (Vout) of the linear regulator 360 to the input (Vbus) of the open-loop DC-DC converter 350 or an electrical current pathway from the output (Vbat) of the open-loop DC-DC converter 350 to the input (Vin) of the linear regulator 360. The electrical current pathway comprises physical components (which may include power bus 354b, a conductive line, etc.) and exists whether or not current is presently flowing through the electrical current pathway. There may be one or more components between the linear regulator 360 and the open-loop DC-DC converter 350 while still providing an electrical current pathway. Thus, being coupled serially does not require a direct physical connection between the linear regulator 360 and the open-loop DC-DC converter 350. In FIG. 3, the output (Vout) of the linear regulator 360 is connected to the input (Vbus) of the open-loop DC-DC converter 350 to provide a current from the linear regulator 360 to the open-loop DC-DC converter 350. Note that the open-loop DC-DC converter 350 may step up the current, in some embodiments. In other words, the current at the output (Vbat) of the open-loop DC-DC converter 350 i greater than the current at the input (Vbus) of the open-loop DC-DC converter 350, in one embodiment. Thus, the output currents of two components that are coupled serially are not required to have the same magnitude. In another example, the input currents of two components that are coupled serially are not required to have the same magnitude.

Figure 10A:
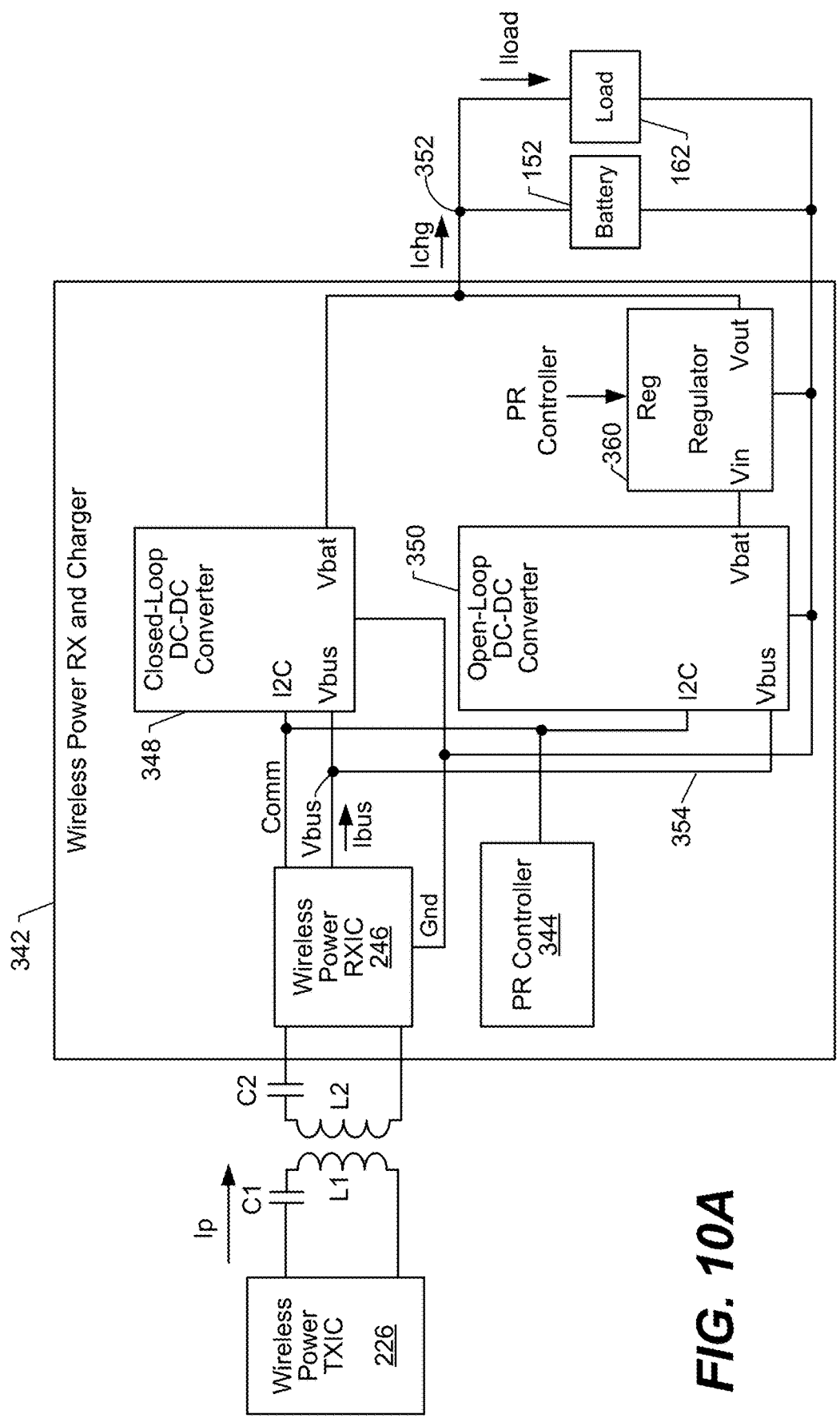
FIGS. 10A-10C are diagrams of embodiments of wireless power RX and chargers having a linear regulator in different arrangements with respect to other components.
Figure 10B:
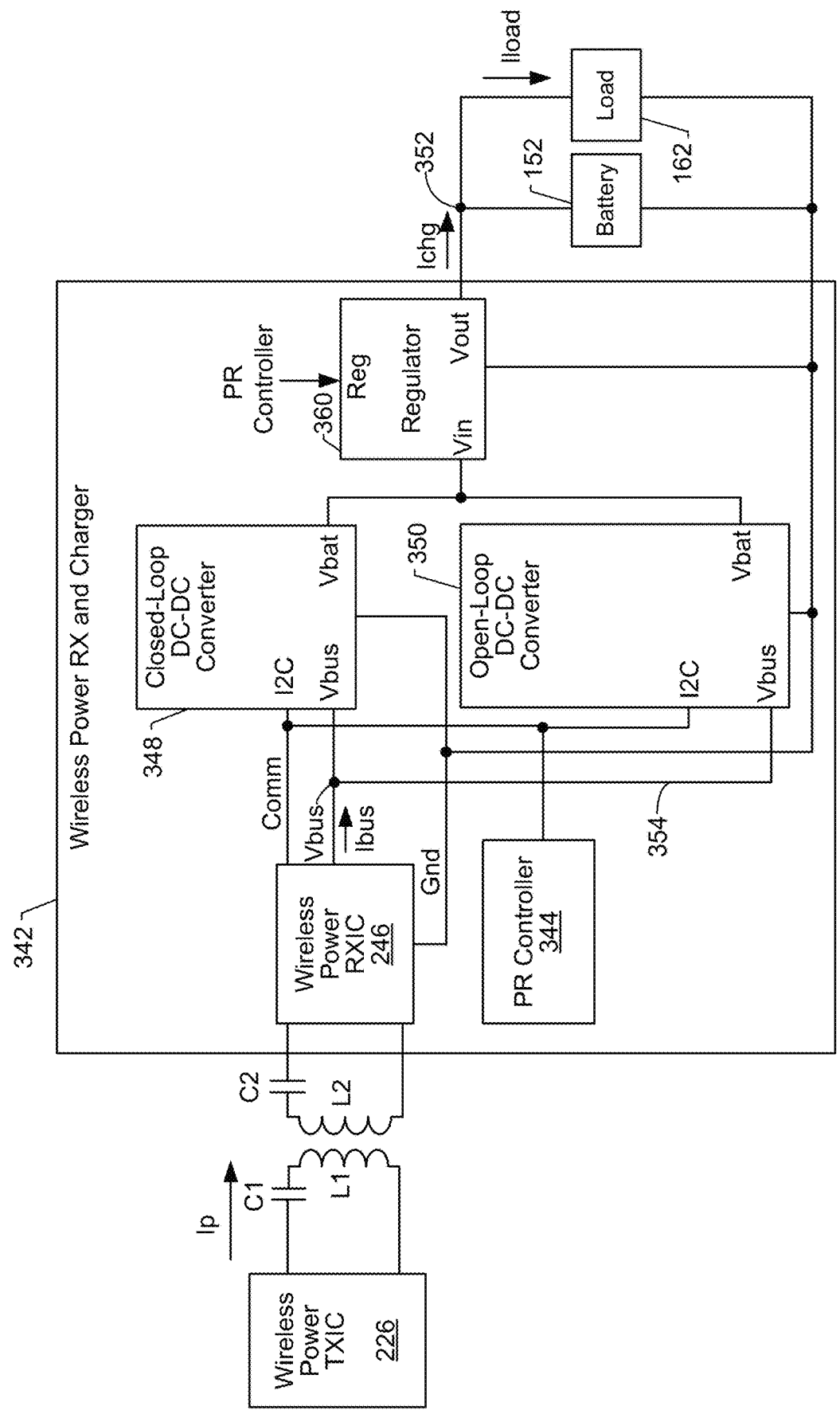
Figure 10C:
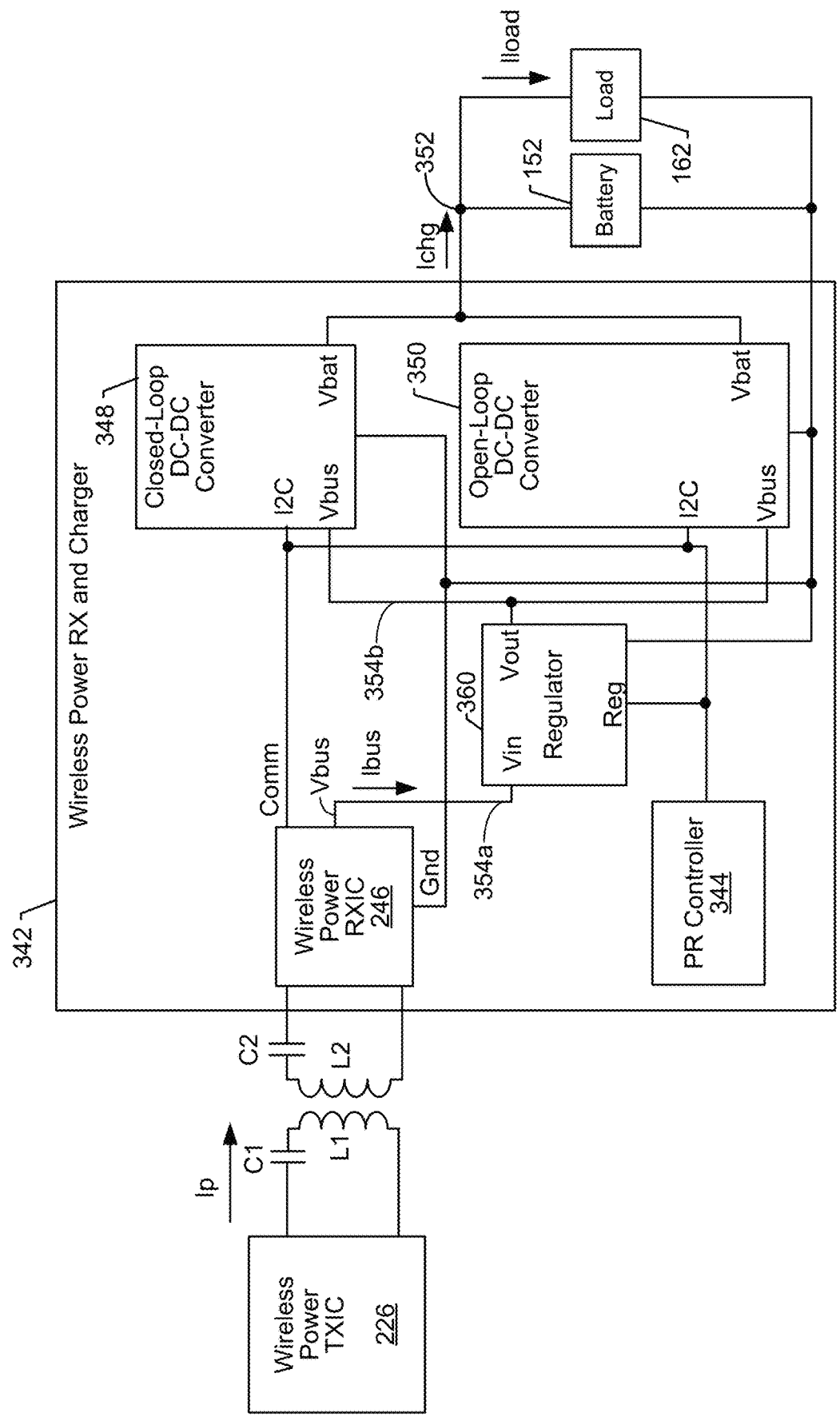

In FIG. 3, the linear regulator 360 is located between the output of the wireless power RXIC 246 and the input of the open-loop DC-DC converter 350. Thus, a portion of the power bus 354b is between the output of the linear regulator 360 and the open-loop DC-DC converter 350. However, there are other possible locations for the linear regulator 360 within the wireless power RX and charger 342. FIGS. 10A-10C depict various embodiments to show other possible locations for the linear regulator 360 in the wireless power RX and charger 342. When the regulator 360 divides the power bus into two portions, those portions are labeled as 354a and 354b, in the drawings. When the regulator 360 is on the battery 152 side of the open-loop DC-DC converter 350, the power bus is labeled as "354" in the drawings.

Figure 4:
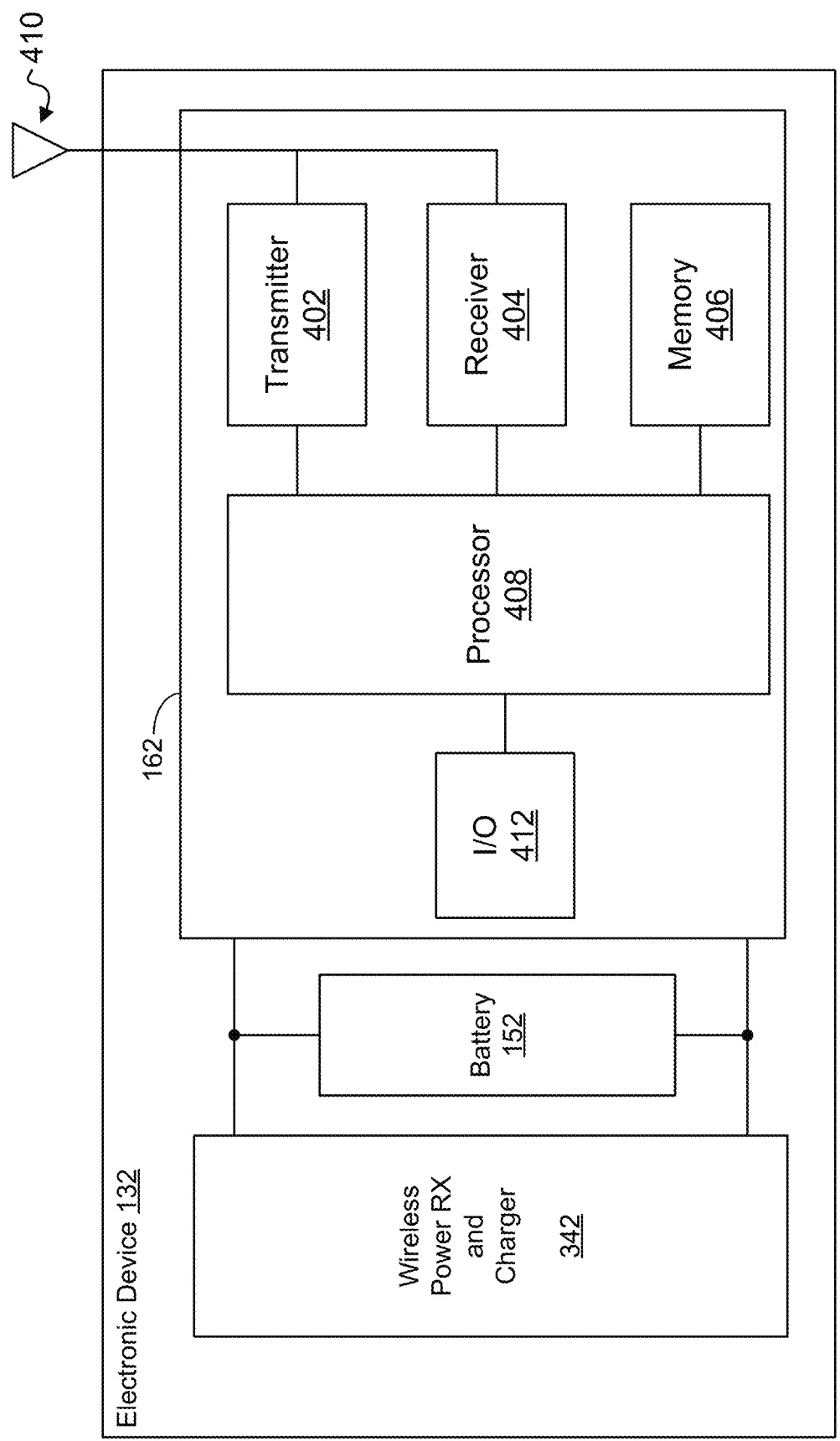
FIG. 4 illustrates example details of an electronic device that may implement the methods and teachings according to this disclosure.

FIG. 4 is an example electronic device 132 in which embodiments may be practiced. The electronic device 132 may for example be a wireless electronic device (e.g., mobile telephone), but may be other devices in further examples such as a desktop computer, laptop computer, tablet, hand-held computing device, automobile computing device and/or other computing devices. As shown in FIG. 4, the electronic device 132 is shown as including a load 162 comprising various electronic components, which include at least one transmitter 402, at least one receiver 404, memory 406, at least one processor 408, and at least one input/output device 412. The processor 408 can implement various processing operations of the electronic device 132. For example, the processor 408 can perform signal coding, data processing, power control, input/output processing, or any other functionality enabling the electronic device 132 to operate. The processor 408 may include any suitable processing or computing device configured to perform one or more operations. For example, the processor 408 may include a microprocessor, microcontroller, digital signal processor, field programmable gate array, or application specific integrated circuit.

The transmitter 402 can be configured to modulate data or other content for transmission by at least one antenna 410. The transmitter 402 can also be configured to amplify, filter and a frequency convert RF signals before such signals are provided to the antenna 410 for transmission. The transmitter 402 can include any suitable structure for generating signals for wireless transmission.

The receiver 404 can be configured to demodulate data or other content received by the at least one antenna 410. The receiver 404 can also be configured to amplify, filter and frequency convert RF signals received via the antenna 410. The receiver 404 is an RF signal receiver, in some embodiments. The receiver 404 can include any suitable structure for processing signals received wirelessly. The antenna 410 can include any suitable structure for transmitting and/or receiving wireless signals. The same antenna 410 can be used for both transmitting and receiving RF signals, or alternatively, different antennas 410 can be used for transmitting signals and receiving signals.

It is appreciated that one or multiple transmitters 402 could be used in the electronic device 132, one or multiple receivers 404 could be used in the electronic device 132, and one or multiple antennas 410 could be used in the electronic device 132. Although shown as separate blocks or components, at least one transmitter 402 and at least one receiver 404 could be combined into a transceiver. Accordingly, rather than showing a separate block for the transmitter 402 and a separate block for the receiver 404 in FIG. 4, a single block for a transceiver could have been shown.

The electronic device 132 further includes one or more input/output devices 412. The input/output devices 412 facilitate interaction with a user. Each input/output device 412 includes any suitable structure for providing information to or receiving information from a user, such as a speaker, microphone, keypad, keyboard, display, or touch screen.

In addition, the electronic device 132 includes at least one memory 406. The memory 406 stores instructions and data used, generated, or collected by the electronic device 132. For example, the memory 406 could store software or firmware instructions executed by the processor(s) 408 and data used to reduce or eliminate interference in incoming signals. Each memory 406 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

During charging of the battery 152 by the wireless power RX and charger 342, the load 162 may draw transient currents. These transient currents could be provided by the battery 152 and/or the wireless power RX and charger 342. When charging the battery 152, the wireless power RX and charger 342 may communicate to the wireless power TX 122. More specifically, the wireless power RX and charger 342 may use the receiver coil L2 to communicate information to the wireless power TX 122. It is possible for the transient currents drawn by the load 162 to interfere with the communication from the wireless power RX and charger 342 to the wireless power TX 122 when the open-loop DC-DC converter 350 is charging the battery 152. Embodiments disclosed herein reduce such communication interference due to transient currents drawn by the load 162.

Figure 5:
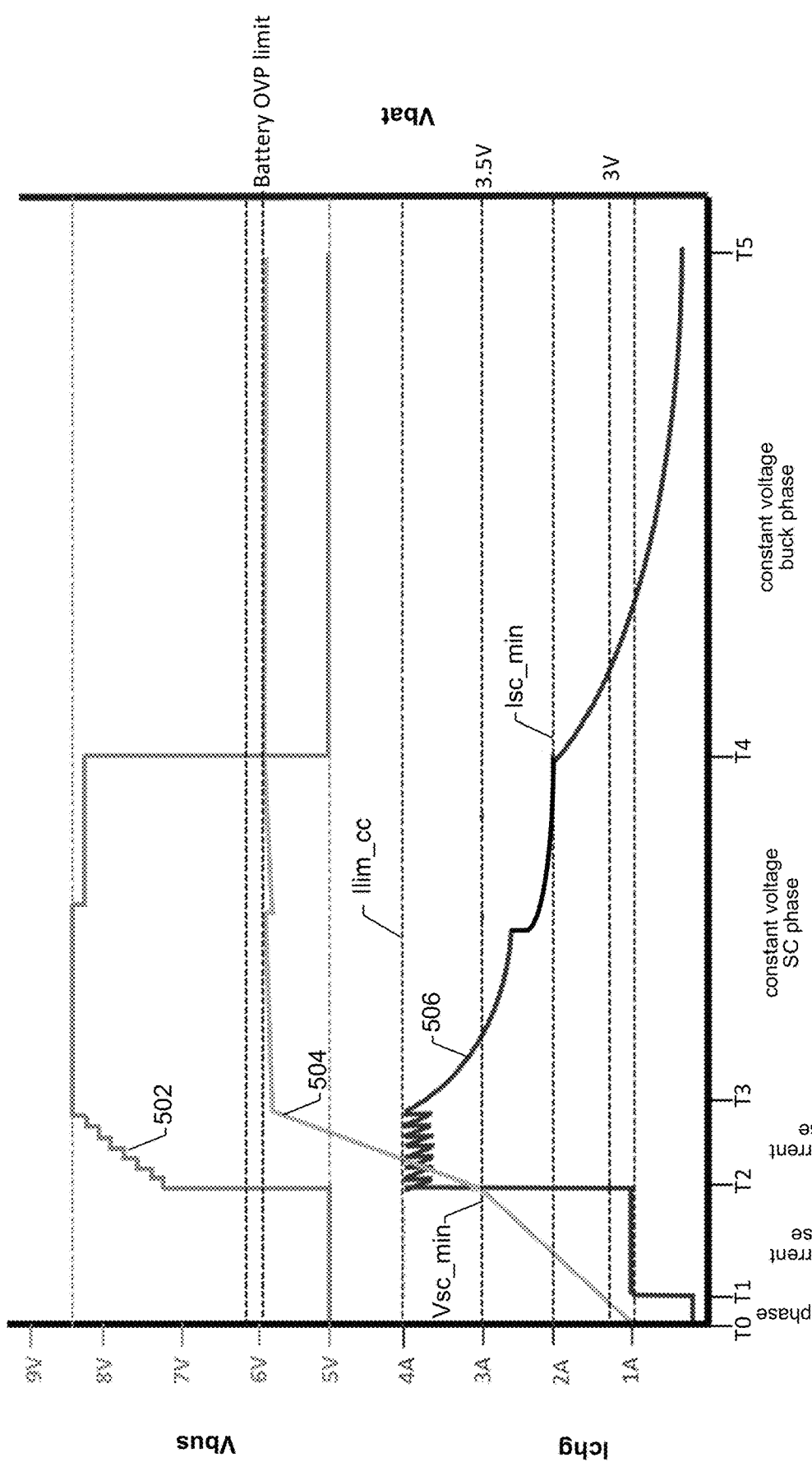
FIG. 5 illustrates a graph that shows an example wireless battery charging profile for the wireless battery charging system shown in FIG. 3.

FIG. 5 shows an example charging profile of the wireless battery charging system 300, accordance to an embodiment of the present technology. More specifically, the graph in FIG. 5 includes a horizontal axis (i.e., the x-axis) that corresponds to time, and a vertical axis (i.e., the y-axis) on the left that corresponds (at the lower portion) to the battery charging current (Ichg), and corresponds (at the upper portion) to the output voltage (Vbus) of the wireless power RXIC 246 in FIG. 3. The vertical axis (i.e., the y-axis) on the right corresponds to the battery charging voltage (Vbat). The battery charging current (Ichg) is the current provided to the battery at the Vbat terminal of the enabled one of the DC-DC converters 348 or 350 in in FIG. 3. The battery charging voltage (Vbat) is the voltage provided to the battery 152 at the Vbat terminal of the enabled one of the DC-DC converters 348 or 350 in in FIG. 3. In FIG. 5 and other FIGS., the following acronyms are sometimes used: SC for switched capacitor; CC for constant current; CV for constant voltage; and OVP for over voltage protection. In the example of FIG. 5, the closed-loop DC-DC converter 348 is a buck converter and the open-loop DC-DC converter 350 is a switched capacitor converter.

As can be appreciated from FIG. 5, the charging profile shown therein includes five charging phases, including a pre-charge phase (between times T0 and T1), a constant current buck phase (between times T1 and T2), a constant current switched capacitor phase (between times T2 and T3), a constant voltage switched capacitor phase (between times T3 and T4), and a constant voltage buck phase (between times T4 and T5). The constant current buck phase (between times T1 and T2) can be referred to more generally as the constant current closed-loop charging phase; the constant current switched capacitor phase (between times T2 and T3) can be referred to more generally as the constant current open-loop charging phase; the constant voltage switched capacitor phase (between times T3 and T4) can be referred to more generally as the constant voltage open-loop charging phase; and the constant voltage buck phase (between times T4 and T5) can be referred to more generally as the constant voltage closed-loop charging phase. The waveform labeled 502 shows an example of how the output voltage (Vbus) of the wireless power RXIC 246 in FIG. 3 changes from one phase to the next; the waveform labeled 504 shows how an example of how the battery charging voltage (Vbat) changes from one phase to the next; and the waveform labeled 506 shows how an example of how the battery charging current (Ichg) changes from one phase to the next.

The waveform labeled 502 shows that the voltage (Vbus) on the power bus 354 at the output of the wireless power RXIC 246 remains constant (e.g., at 5V) during the pre-charge phase (between times T0 and T1) and during the constant current buck phase (between times T1 and T2). The output voltage (Vbus) is shown as increasing from 5V to about 7.2V at time T2, and then gradually stepping up from 7.2V to about 8.4V during the constant current switched capacitor phase (between times T2 and T3). The output voltage (Vout) then stays at about 8.4V for a portion of the constant voltage switched capacitor phase (between times T3 and T4), and gradually drops to about 8.2V for a remaining portion of the constant voltage switched capacitor phase. The output voltage (Vbus) is shown as decreasing from 8.2V back to 5V at time T4 and remaining at 5V during the constant voltage buck phase (between times T4 and T5).

Still referring to FIG. 5, the waveform labeled 504 shows that the battery charging voltage (Vbat) steadily increases at a first rate from about 3V to about 3.5V during the pre-charge phase (between times T0 and T1) and during the constant current buck phase (between times T1 and T2). The battery charging voltage (Vbat) is shown as steadily increasing at a second rate (that is greater than the first rate) from about 3.5V to about 4.2V during the constant current switched capacitor phase (between times T2 and T3). The battery charging voltage (Vbat), during the constant voltage switched capacitor phase (between times T3 and T4), very slowly increases to a battery over voltage protection (OVP) level, then is reduced slightly and then again slowly increases to the battery OVP level. The battery charging voltage (Vbat) is shown as remaining constant (just below the battery OVP level) during the constant voltage buck phase (between times T4 and T5).

The waveform labeled 506 shows that the battery charging current (Ichg) stays constant at about 0.2 Amps (A) during the pre-charge phase (between times T0 and T1). At time T1 the battery current (Ichg) jumps up to about 1 A and stays constant at about 1 A during the constant current buck phase (between times T1 and T2). The battery charging current (Ichg) is shown as varying between about 4 A and 3.7 A in a sawtooth manner during the constant current switched capacitor phase (between times T2 and T3). The battery charging current (Ichg), during the constant voltage switched capacitor phase (between times T3 and T4), decreases from about 4 A to about 2 A in a parabolic manner, with a brief decrease corresponding to when the battery charging voltage (Vbat) reached the OVP level. The battery charging current (Ichg) is shown as decreasing from about 2 A to the termination current close to 0 A in a parabolic manner during the constant voltage buck phase (between times T4 and T5).

Figure 6:
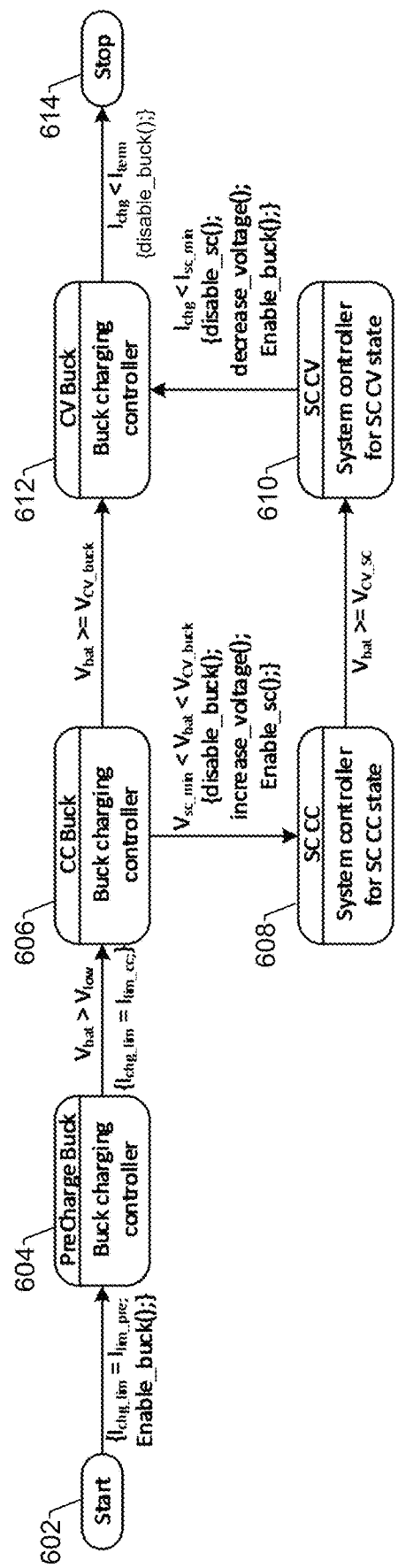
FIG. 6 is a state diagram that is used to explain how the wireless battery charging system shown in FIG. 3 operates in accordance with certain embodiments of the present technology.

FIG. 6 is a state diagram that is used to explain how the wireless battery charging system shown in FIG. 3 operates in accordance with certain embodiments of the present technology. Referring to FIG. 6, following start 602 a battery charging current limit (Ichg_lim) is set equal to a pre-charge current limit (Ilim_pre), and the buck converter (248 in FIG. 3) is enabled. State 604 corresponds to the pre-charge phase, during which the closed-loop charger 348 (e.g., buck charger) performs pre-charging and the battery charging current limit (Ichg_lim) is set equal to a constant current limit (Ilim_cc). The pre-charging using the buck charger continues until the battery charging voltage (Vbat) exceeds a first voltage threshold (Vlow), which can also be referred to as a pre-charge voltage threshold. State 606 corresponds to the constant current buck phase, during which the battery charging current (Ichg) is kept constant, and the battery charging voltage (Vbat) is gradually increased. When the battery charging voltage (Vbat) exceeds a second voltage threshold (Vsc_min), but is below a third voltage threshold (Vcv_buck), then the buck charger is disabled, the open-loop charger 350 (e.g., switched capacitor charger) is enabled, and state 608 occurs. State 608 corresponds to the switched capacitor constant current phase, during which the switched capacitor charger is used to charge the battery 152 while maintaining the battery charging current (Ichg) generally constant until the battery charging voltage (Vbat) reaches a further voltage threshold (Vcv_sc), at which point there is a transition to state 610. State 610 corresponds to the constant voltage switch capacitor state, during which the switched capacitor charger is used to charge the battery while maintaining the battery charging voltage (Vbat) generally constant until the battery charging current (Ichg) falls below a first current threshold (Isc_min), at which point the switched capacitor charger is disabled, the buck charger is enabled, and there is a transition to state 612. As shown in FIG. 6, it is also possible that there can be a jump to state 612 directly from state 606, if the battery charging voltage (Vbat) exceeds the third voltage threshold (Vcv_buck). This may happen, e.g., if a battery starting to be charged is already close to being fully charged from the start.

State 612 corresponds to the constant voltage buck phase, during which the buck charger is used to charge the battery while maintaining the battery charging voltage (Vbat) generally constant until the battery charging current (Ichg) falls below a second current threshold (Iterm), at which point the buck charger is disabled, and the charging stops at state 614, because the battery is fully charged.

In the above description Ilim is a current limit setting for pre-charge, an example value is 120 mA. Ilim_cc is current limit setting for CC buck charging, an example value is 1 A-2 A. Iterm is the termination current setting, an example value is 10 mA. Vcv_sc is the minimum voltage to enter CV SC, an example value is 4.1V. Vcv_buck is the minimum voltage to enter CV buck, an example value is 4.2V.

The PR controller 344 is used to control the system 300 when the open-loop DC-DC converter 350 is used to charge the battery 152, in some embodiments. When the open-loop DC-DC converter 350 operates, the PR controller 344 controls the overall wireless battery charging system to operate in a closed-loop mode. In some embodiments, the PR controller 344 regulates Ichg (for the CC SC state) or charging voltage (for the CV SC state). In a constant current charging state, the PR controller 344 regulates the charging current to follow a target value. In a constant voltage charging state, the PR controller 344 regulates the battery charging voltage to follow a target value.

In one embodiment, the PR controller 344 regulates the voltage (Vin) at the input of the wireless power TXIC 226 and the voltage (Vbus) at the output of the wireless power RXIC 246 to realize one or more objectives. One objective is to regulate the charging current (for the CC SC state) or charging voltage (for the CV SC state). The other objective is to control the gain between output of the RXIC 246 and the input of the TXIC 226 (Vbus/Vin) to be close to a specific value that supports the variation in coupling and loading conditions. One other objective could be to control the operating frequency of the wireless charging system to be at or close to a specific value that supports the variation in coupling and loading conditions. The control of Vbus can be done via communications within the charger 342, such as by the PR controller 344 sending a command to the RXIC to change its output reference. The control of Vin (at the input of the wireless power TXIC 226) may be done by the PR controller 344 sending a command to the RXIC 246 to communicate information to the TXIC 226 using the receiver coil L2. If communication between the wireless power RXIC 246 and wireless power TXIC 226 are compromised, then control of the open-loop DC-DC converter 350 may be compromised, as well.

Figure 7:
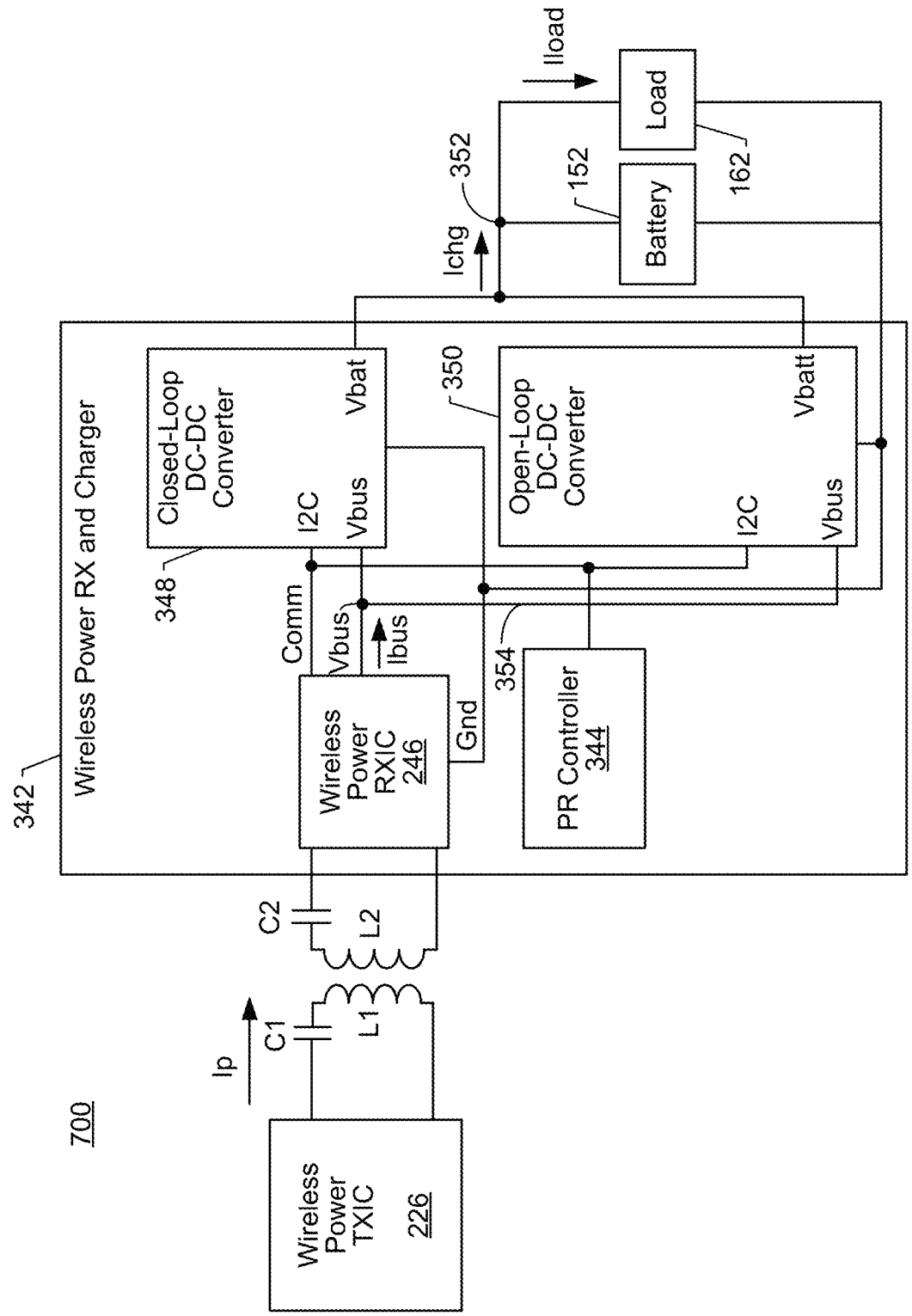
FIG. 7 is a diagram of a system for charging a battery.

FIG. 7 is a diagram of a system 700 for charging a battery 152. The system 700 includes wireless power RX and charger 342, which is connected to a battery 152 and a load 162. The wireless power RXIC 246 of the wireless power RX and charger 342 receives power wirelessly from the wireless power TXIC 226. The wireless power RX and charger 342 is similar to the system 300 of FIG. 3, but does not have a linear regulator 360 to reduce or eliminate interference from the load 162 when using the receiver coil L2 to communicate to the wireless power TXIC 226 while the open-loop DC-DC converter 350 is being used to charge the battery 152. In order to simplify the drawing, the wireless power TX 122 from FIG. 3 has been simplified to only depict the wireless power TXIC 226, C1, and L1. The system 700 may have other elements shown in FIG. 3 such as the PD controller 224, half-bridge inverter 228, and/or adaptor 112.

Figure 8A:
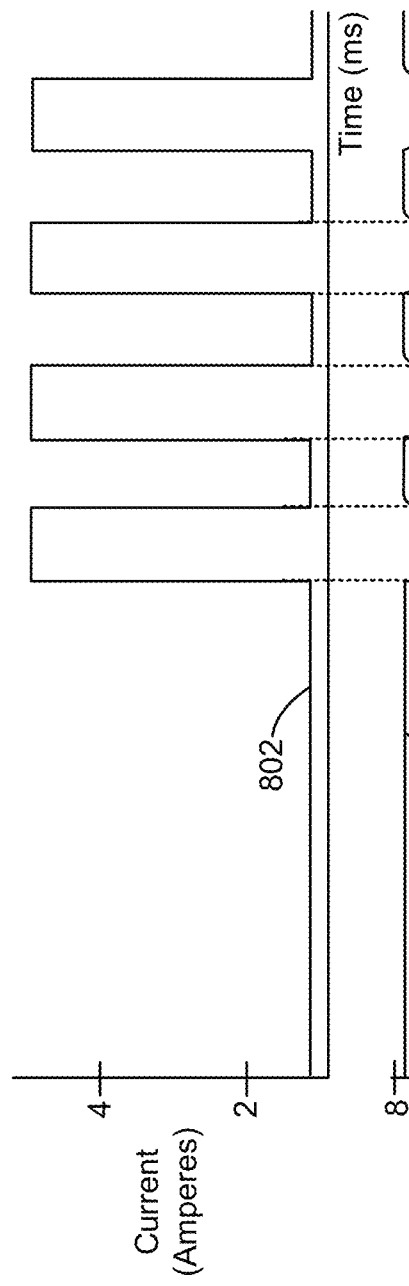
FIGS. 8A-8C are graphs of various waveforms to illustrate how the load can interfere with communication in the system of FIG. 7 when charging the battery using the open-loop DC-DC converter.
Figure 8B:
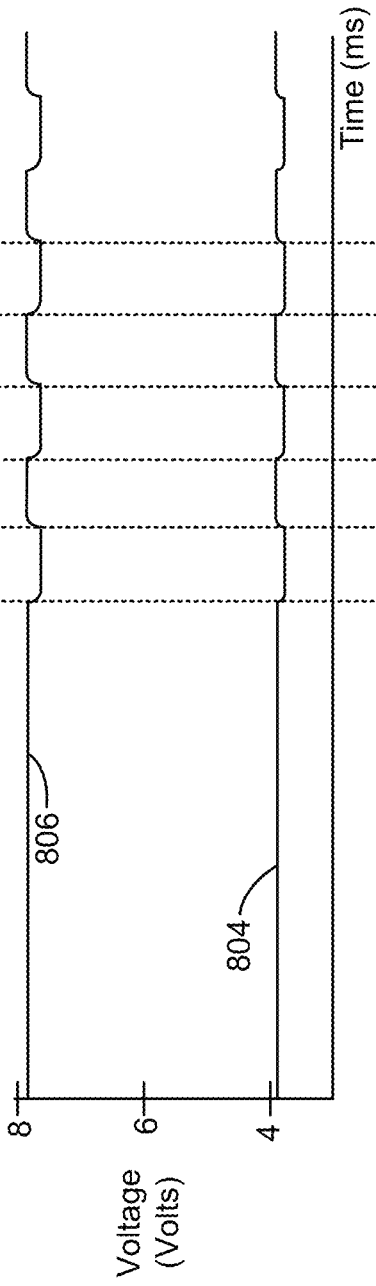
Figure 8C:
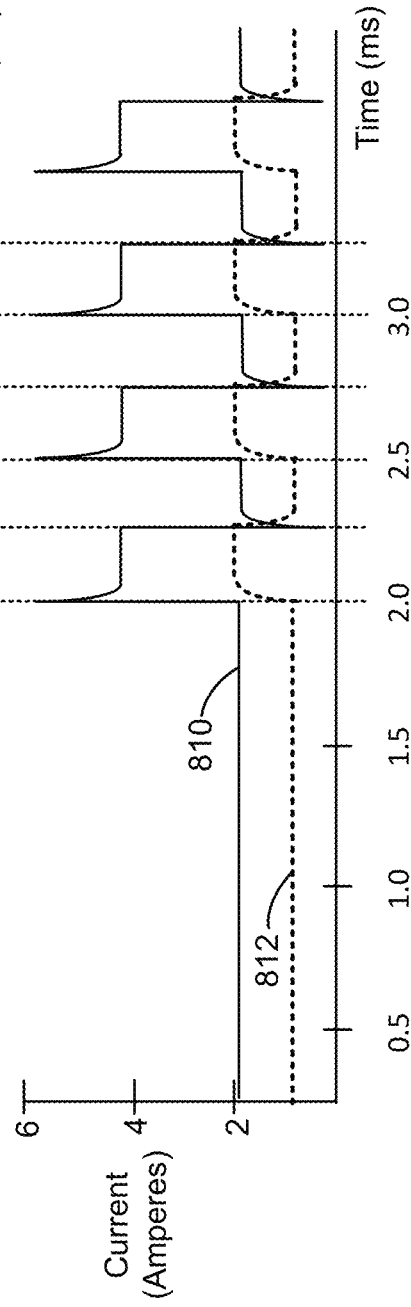

FIGS. 8A-8C are graphs of various waveforms to illustrate how the load 162 can interfere with communication in the system 700 of FIG. 7 when charging the battery 152 using the open-loop DC-DC converter 350. In particular, transient current drawn by the load 162 can interfere with communication in which the receiver coil L2 is used to communicate information to the wireless power TXIC 226. The waveforms are for various currents and voltages when the open-loop DC to DC converter 350 is being used to charge the battery 152. The horizontal axis in each diagram 8A-8C represents time. The time axes are aligned with each other and cover the same time period. The units of time are milliseconds, in this example. The vertical axis in FIG. 8A represents current for waveform 802. The vertical axis in FIG. 8B represents voltage for waveforms 804 and 806. The vertical axis in FIG. 8C represents current for waveforms 810 and 812.

Waveform 802 in FIG. 8A represents a current (Iload) drawn by the load 162. Up until time 2.0 (ms) the load current is steady. Therefore, the load current is not transient in nature before time 2.0 (ms), and does not interfere with communication using the receiver coil L2. After time 2.0 (ms), the load current is periodic, with a frequency of about 2000 Hz, in this example. That is, there are periodic changes in the amount of current drawn by the load 162. Thus, after time 2.0 (ms), the load current is transient in nature in that it has one or more momentary variations in current magnitude. Note that the load current could be provided by the open-loop DC to DC converter 350 and/or the battery 152.

Waveform 810 in FIG. 8C represents the current (Ichg) that is provided by the output of the open-loop DC to DC converter 350. Waveform 812 in FIG. 8C represents the current (Ibus) that is on the power bus 354 at the output of the wireless power RXIC 246. In FIG. 7, the power bus 354 connects the output of the wireless power RXIC 246 to the input of open-loop DC to DC converter 350, such that the current at the input of the open-loop DC to DC converter 350 is the same as the current (Ibus) on the power bus 354 at the output of the wireless power RXIC 246. Note that this assumption is based on operating the open-loop DC to DC converter 350 while the closed-loop DC to DC converter 348 is not enabled and hence does not input a current from or output a current to the power bus 354. It is further assumed that the open-loop DC to DC converter 350 in this particular drawing is a switched capacitor charger with voltage down conversion ratio of 2:1, such that Ibus (as shown by the waveform 812) is approximately half in value compare to the Ichg (as shown by the waveform 810). It is noted that during steady state (prior to 2 ms) Iload (as shown by the waveform 802) is lower in value as compared to Ichg (as shown by the waveform 810). This indicates that the excess current flows into the battery 152, and the battery is being charged. After 2 ms, when Iload (as shown by the waveform 802) presents high transient current, Iload has a higher value as compared to Ichg (as shown by the waveform 810). This because at this point, the battery 152 is no longer being charged. Instead, the battery 152 is discharging and supplementing the additional current demanded by the load 162 (as shown by the waveform 802) that cannot be provided by the current (Ichg) provided by the DC-DC open-loop converter 350.

Waveform 804 in FIG. 8B represents the voltage (Vbat) at the terminal 352 connected to the battery 152. In FIG. 7, the voltage at the terminal 352 to the battery 152 is the same as the voltage at the output (Vbat) of the open-loop DC to DC converter 350. Waveform 806 in FIG. 8C represents the voltage (Vbus) that is on the power bus 354 at the output of the wireless power RXIC 246. In FIG. 7, the voltage at the input of open-loop DC to DC converter 350 is the same as the voltage (Vbus) that is output by the wireless power RXIC 246 to the power bus 354. It is further assumed that the open-loop DC to DC converter 350 in this particular drawing is a switched capacitor charger with voltage down conversion ratio of 2:1, such that the voltage Vbus (as depicted by waveform 806) is approximately twice in value compare to the voltage Vbat (as depicted by waveform 804). During steady state (before 2 ms), Vbat is maintained at a level such that the open-loop DC to DC converter 350 provides a steady current charging the battery. When load transient occurs at 2 ms and periodically thereafter, it is noted that the battery voltage Vbat (as depicted by waveform 804) periodically decreases. Thus, Vbat periodically decreases as compared to its value before 2 ms (when there is no load transients). This is because at this point, the battery 152 is discharging and supplementing the additional current demanded by the load (Iload) that cannot be provided by the current (Ichg) provided by the DC-DC open-loop converter 350. As the battery 152 discharges, the voltage at the battery terminal decreases.

When the battery is being charged (e.g., when there is not a transient load current), the voltage drop caused by internal resistance of the battery may add on top of the battery core voltage. In contrast, when the battery is being discharged (e.g., when there is a transient load current), the voltage drop caused by internal resistance of the battery may subtract from the battery core voltage. The net effect is that the battery voltage may oscillate (see waveform 804) in response to the transient load current. This oscillation in battery voltage may be enough to cause a sudden change in current from the DC-DC open-loop converter 350 since this current may depend on voltage difference between the output of the wireless power RXIC 246 and the battery voltage.

Thus, waveforms 804 and 810 show that both the voltage and current at the output of the open-loop DC to DC converter 350 vary in response to the transitions in the load current, and the transition in battery voltage (Vbat) as a result of it. Because the DC to DC converter 350 operates in an open-loop, the variations in voltage and current at its output (Vbat) will cause variations in voltage and current at its input (Vbus). Thus, when the voltage (shown as waveform 804) at the output of the open-loop DC to DC converter 350 rises and falls, the voltage (shown as waveform 806) at the input of the open-loop DC to DC converter 350 rises and falls. Likewise, when the current (shown as waveform 810) at the output of the open-loop DC to DC converter 350 rises and falls, the current (shown as waveform 812) at the input of the open-loop DC to DC converter 350 rises and falls.

Referring now to FIG. 7, when the voltage at the input of the open-loop DC to DC converter 350 rises and falls, the voltage (Vbus) on the power bus 354 at the output of the wireless power RXIC rises and falls. Likewise, when the current at the input of the open-loop DC to DC converter 350 rises and falls, the current (Ibus) in the power bus 354 at the output of the wireless power RXIC rises and falls. Such changes in the voltage and/or current at the output of the wireless power RXIC 246 cause changes in the current through the receiver coil L2, which induce changes in the current Ip in coil L1 of the wireless power TXIC 226. Communication from the wireless power RXIC 246 to the wireless power TXIC 226 depends on the wireless power TXIC 226 detecting small changes in the current Ip in coil L1. The changes in the current Ip that are induced by the transient load current can therefore interfere with the communication.

Embodiments disclosed herein can reduce the variation in Vbus and Ibus during load transients, which mitigate the wireless communication interference issue. In one embodiment, as shown in FIG. 3, the regulator 360 is inserted into the power bus 354. The regulator 360 stabilizes voltage at the output of the wireless power RXIC 246 by reacting to the load current transient and increasing its internal resistance to create a voltage drop between the output of the wireless power RXIC 246 and the input of the open-loop DC-DC converter 350. This effectively limits the current Ibus and the voltage variation of Vbus on the power bus 354*a* to a sufficient degree that the interference to communication is mitigated. In another embodiment, as shown in FIG. 10A, the regulator 360 is inserted between the output of the open-loop DC-DC converter 350 and the battery 152. The regulator 360 stabilizes voltage at the output of the open-loop DC-DC converter 350 by reacting to the load current transient and increasing its internal resistance to create a voltage drop between the output of the open-loop DC-DC converter 350 and the battery 152. This essentially forces the battery 152 to be the primary source for the load transient current. This mechanism in turn stabilizes Vbus and Ibus on the power bus 354 at the output of the wireless power RXIC 246 to a sufficient degree that the interference to the wireless communication is mitigated.

FIGS. 9A and 9B are graphs to illustrate how transient currents drawn by the load 162 may impact wireless communication when using the receiver coil L2 of FIG. 7. FIG. 9A depicts packet failure rate (vertical axis) versus load current frequency (horizontal axis). The packets refer to packets of information that are sent from the wireless power RXIC 246 to the wireless power TXIC 226 using, for example, the Qi standard. Line 902 represents the packet failure rate. Line 904 represents the approximate frequency of wireless communication from the wireless power RXIC 246 to the wireless power TXIC 226. When the frequency of the transient current is near the frequency of wireless communication, the packet failure rate is at its highest, in this example.

Embodiments disclosed herein can reduce the packet failure rate, which includes reducing the packet failure rate to zero. In one embodiment, the current regulator 360 is used to stabilize Ibus in the power bus 354 at the output of the wireless power RXIC 246 to a sufficient degree that there is a reduction in the packet failure rate. In one embodiment, the current regulator 360 is used to stabilize Vbus on the power bus 354 at the output of the wireless power RXIC 246 to a sufficient degree that there is a reduction in the packet failure rate. In one embodiment, the current regulator 360 is used to stabilize both Ibus and Vbus at the output of the wireless power RXIC 246 to a sufficient degree that there is a reduction in the packet failure rate.

FIG. 9B depicts complete communication failure rate (vertical axis) versus load current frequency (horizontal axis). For example, the load interference may be so severe that even remedial actions such as resending failed packets may be unsuccessful at providing communication. Line 906 represents the complete communication failure rate. Line 904 again represents the approximate frequency of wireless communication from the wireless power RXIC 246 to the wireless power TXIC 226. When the frequency of the transient current is near the frequency of wireless communication, the complete communication failure rate is at its highest, in this example. Embodiments disclosed herein can reduce the complete communication failure rate, which includes reducing the complete communication failure rate to zero.

FIGS. 10A-10C are diagrams of various embodiments of wireless power RX and chargers 342 having a linear regulator 360. The linear regulator 360 may be used to reduce interference from transient currents drawn by the load 162 connected to the wireless power RX and chargers 342. Thus, wireless communication using the receiver coil L2 may be improved. The wireless power RX and chargers 342 operate in a similar manner as described with respect to the wireless power RX and charger 342 of FIG. 3, with a difference being the location of the linear regulator 360. To simplify the diagrams, the adaptor 112, and some components in the wireless power TX 122 have not been depicted in FIGS. 10A-10C.

Referring now to FIG. 10A, the wireless power RX and charger 342 has a wireless power RXIC 246, a closed-loop DC-DC converter 348, an open-loop DC-DC converter 350, and a linear regulator 360. In one embodiment, the linear regulator 360 is used to limit a current such that the current does not exceed a target level. For example, the linear regulator 360 may be used to limit Ichg such that Ichg does not exceed a target current for charging the battery 152 when using the open-loop DC-DC converter 350.

The output (Vout) of the linear regulator 360 provides Ichg to the battery 152 when the open-loop DC-DC converter 350 is being used to charge the battery 152. A portion of Ichg could be drawn by the load 162. Note that the PR controller 344 controls the components in the wireless power RX and charger 342 such that the open-loop DC-DC converter 350 provides a current to the linear regulator 360 (when the open-loop DC-DC converter 350 is being used to charge the battery 152). Assuming that the linear regulator 360 is not actively regulating the current through the linear regulator 360, then the magnitude of the current provided to the linear regulator 360 is determined by the load current Iload and battery voltage Vbat. When the load current is light, Ichg supplies both load current Iload and the battery charging current. While a heavy load current is pulled by the load 162, such that Iload exceeds Ichg, the battery reverses its role from charging to discharging and supplements Ichg in providing the load current Iload. In this process, the battery voltage Vbat decreases as the role of battery changes, such that a larger voltage difference is created between the output of the Wireless power RXIC 246 and the battery voltage. Due to the nature of open-loop circuit, a larger voltage difference naturally causes higher Ichg.

When the open-loop DC-DC converter 350 is being used to charge the battery 152, the closed-loop DC-DC converter 348 is not active, such that the closed-loop DC-DC converter 348 is not providing any of Ichg at that time, in one embodiment. However, the closed-loop DC-DC converter 348 provides Ichg when the closed-loop DC-DC converter 348 is being used to charge the battery 152.

The linear regulator 360 is connected along an electrical power pathway from the output of the wireless power RX to the terminal 352 connected to the side of the battery 152 that is not connected to ground (gnd). The electrical power pathway has a portion that passes from the input of the open-loop DC-DC converter 350 to the output of the open-loop DC-DC converter 350. It may also be stated that the linear regulator 360 is coupled serially with the open-loop DC-DC converter 350. In FIG. 10A, the input (Vin) of the linear regulator 360 is connected to the output (Vbat) of the open-loop DC-DC converter 350 to receive the current from the open-loop DC-DC converter 350. Note that the open-loop DC-DC converter 350 may step up the current, in some embodiments. Thus, the current at the output (Vbat) of the open-loop DC-DC converter 350 may be different magnitude than the current at the output (Vout) of the linear regulator 360.

The linear regulator 360 has a first mode in which it is actively regulating a current in the linear regulator 360 and a second mode in which it is not actively regulating a current in the linear regulator 360, in one embodiment. When the linear regulator 360 is not actively regulating a current, the voltage drop across the linear regulator 360 (between Vin and Vout) is very close to zero and the resistance from the input (Vin) to the output (Vout) of the linear regulator 360 is very low. In order to regulate a current, the voltage drop increases and the resistance from the input (Vin) to the output (Vout) increases, in one embodiment.

The PR controller 344 controls the linear regulator 360 to stabilize Ibus in the power bus 354 at the output of the wireless power RX 246 and/or Vbus on the power bus at the output of the wireless power RXIC 246. Stabilizing Ibus and/or Vbus at the output of the wireless power RXIC 246 may reduce load interference when using the receiver coil L2 to wirelessly communicate from the wireless power RXIC 246 to the wireless power TXIC 226 while the open-loop DC-DC converter 350 is being used to charge the battery 152.

The linear regulator 360 stabilizes a current and/or voltage at its input (Vin), in one embodiment, which in turn stabilizes a current and/or voltage at the output (Vbat) of the open-loop DC-DC converter 350. If the current and/or voltage at the output (Vbat) of the open-loop DC-DC converter 350 were not stabilized, the current and/or voltage at the input (Vbus) of the open-loop DC-DC converter 350 could be unstable. Therefore, Ibus and/or Vbus on the power bus 354 at the output of the wireless power RXIC 246 could be unstable, which could interfere with wireless communication using the receiver coil L2. However, since the linear regulator 360 stabilizes a current and/or voltage at its input (Vin), the net effect is that Ibus and/or Vbus on the power bus 354 at the output of the wireless power RXIC 246 is stabilized. The linear regulator 360 stabilizes both a current and a voltage at its input (Vin), in one embodiment, which has the net effect of stabilizing both Ibus and Vbus on the power bus 354 at the output of the wireless power RXIC 246.

FIGS. 10B and 10C show other locations for the linear regulator 360 within the wireless power RX and charger 342. FIG. 10B shows an embodiment in which the input (Vin) of the linear regulator 360 is connected to the outputs of both the closed-loop DC-DC converter 348 and the open-loop DC-DC converter 350. The output (Vout) of the linear regulator 360 provides Ichg to the battery 152 when the open-loop DC-DC converter 350 is being used to charge the battery 152. A portion of Ichg could be drawn by the load 162. Operation of the linear regulator 360 of FIG. 10B may be similar to the embodiment of FIG. 10A, and hence will not be described again. The linear regulator 360 is not required to be used to actively regulate when the closed-loop DC-DC converter 348 is being used to charge the battery 152.

FIG. 10C shows an embodiment in which the output (Vout) of the linear regulator 360 is connected to the inputs of both the closed-loop DC-DC converter 348 and the open-loop DC-DC converter 350. The input (Vin) of the linear regulator 360 is provided with Vbus from the output of the wireless power RXIC 246. Operation of the linear regulator 360 of FIG. 10C may be similar to the embodiment of FIG. 3, and hence will not be described again. The linear regulator 360 is not required to be used to actively regulate when the closed-loop DC-DC converter 348 is being used to charge the battery 152.

In the various embodiments of FIGS. 3, 10A, 10B, and 10C, two or more of the linear regulator 360, open-loop DC-DC converter 350, and closed-loop DC-DC converter 348 may be integrated in the same semiconductor package. In one embodiment, the linear regulator 360 and the open-loop DC-DC converter 350 are integrated in the same semiconductor package, but the closed-loop DC-DC converter 348 is in a separate package. In one embodiment, all three of the linear regulator 360, the open-loop DC-DC converter 350, and the closed-loop DC-DC converter 348 are integrated in the same semiconductor package.

Figure 11A:
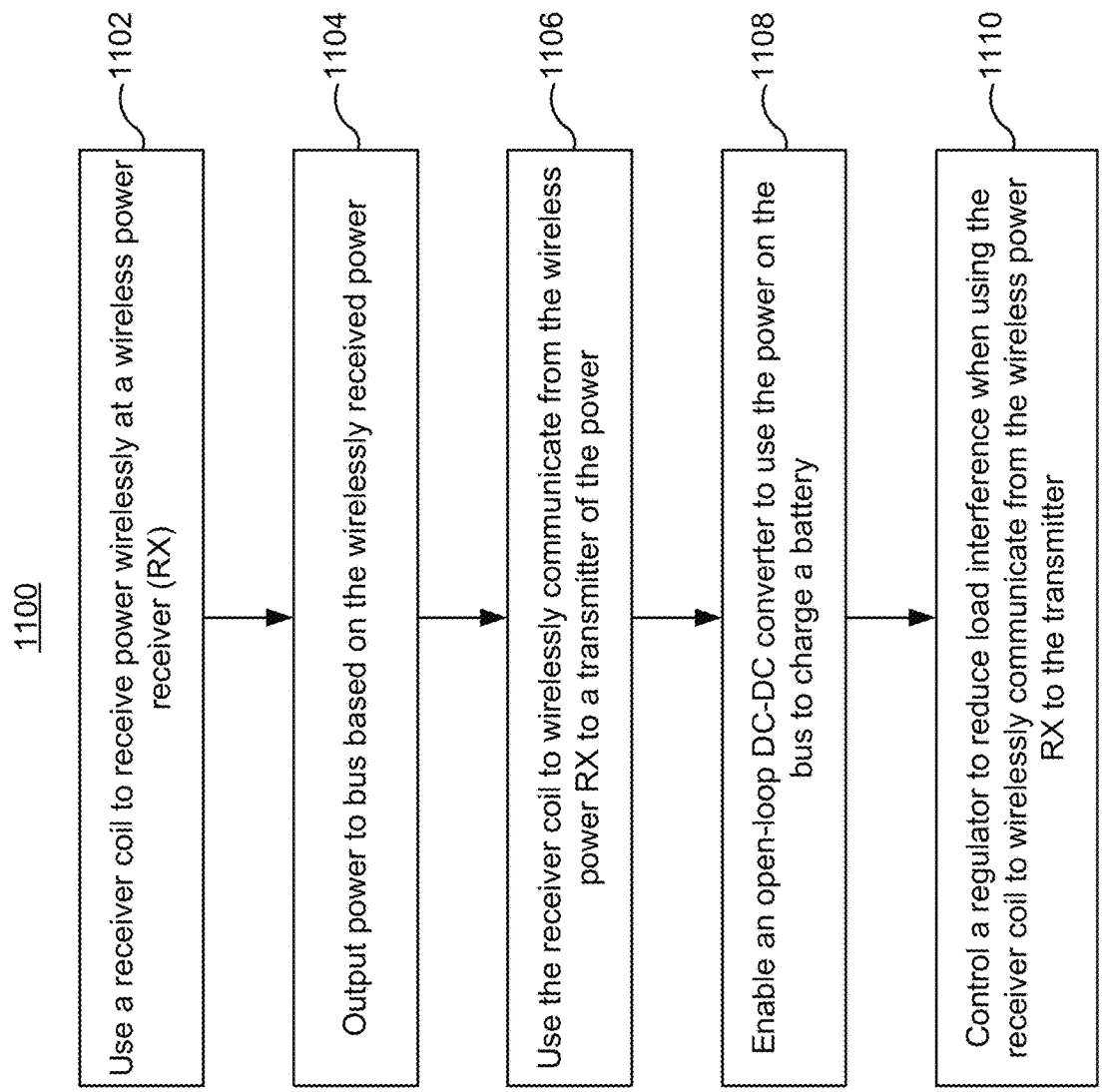
FIG. 11A is a flowchart of one embodiment of a process of operating a wireless power RX and charger using an open-loop DC-DC converter.

FIG. 11A is a flowchart of one embodiment of a process 1100 of operating a wireless power RX and charger 342. The process 1100 may be used in any of the wireless power RX and chargers 342 of FIGS. 3, 10A-10C, but is not limited thereto. Step 1102 includes using a receiver coil L2 to receive power wirelessly at a wireless power RXIC 246. The power is transmitted from the wireless power TXIC 226, in one embodiment. The received power is AC power, in one embodiment.

Step 1104 includes the wireless power RXIC 246 outputting power to the power bus 354 based on the wirelessly received power, in one embodiment. The power on the power bus 354 is DC power, in one embodiment. The wireless power RXIC 246 outputs Ibus and Vbus to the power bus 354 based on the wirelessly received power, in one embodiment.

Step 1106 includes using the receiver coil L2 to wirelessly communicate from the wireless power RXIC 246 to a transmitter of the power. The wireless power RXIC 246 uses the receiver coil L2 to communicate with the wireless power TXIC 226, in one embodiment. In one embodiment, the communication is performed in accordance with the Qi-standard.

Step 1108 includes enabling an open-loop DC-DC converter 350 to use the power on the power bus 354 to charge a battery 152. Step 1108 may include operating the open-loop DC-DC converter 350 in a constant current phase and/or a constant voltage phase. For example, step 1108 may include operating the open-loop DC-DC converter 350 between times T2 and T4 in FIG. 5. In one embodiment, step 1108 includes operating the open-loop DC-DC converter 350 in state 608 and/or state 610 in FIG. 6.

Step 1110 includes controlling a linear regulator 360 to reduce load interference when using the receiver coil L2 to communicate from the wireless power RXIC 246 to the transmitter of the power (e.g., the wireless power TXIC 226). Step 1110 includes controlling the linear regulator 360 to stabilize a current (Ibus) in the power bus 354 at the output of the wireless power RXIC 246, in one embodiment. Step 1110 includes controlling the linear regulator 360 to stabilize a voltage (Vbus) on the power bus 354 at the output of the wireless power RXIC 246, in one embodiment. Step 1110 includes controlling the linear regulator 360 to stabilize both Ibus and Vbus at the output of the wireless power RXIC 246, in one embodiment. Step 1110 is performed while the open-loop DC-DC converter 350 is enabled to use the wirelessly received power to charge the battery 152. The load interference originates from transient current from load 162, in one embodiment. The transient current may be periodic, as in waveform 802 in FIG. 8A. The frequency of the transient current may be near the frequency of the wireless communication of step 1106, but this is not a requirement.

Figure 11B:
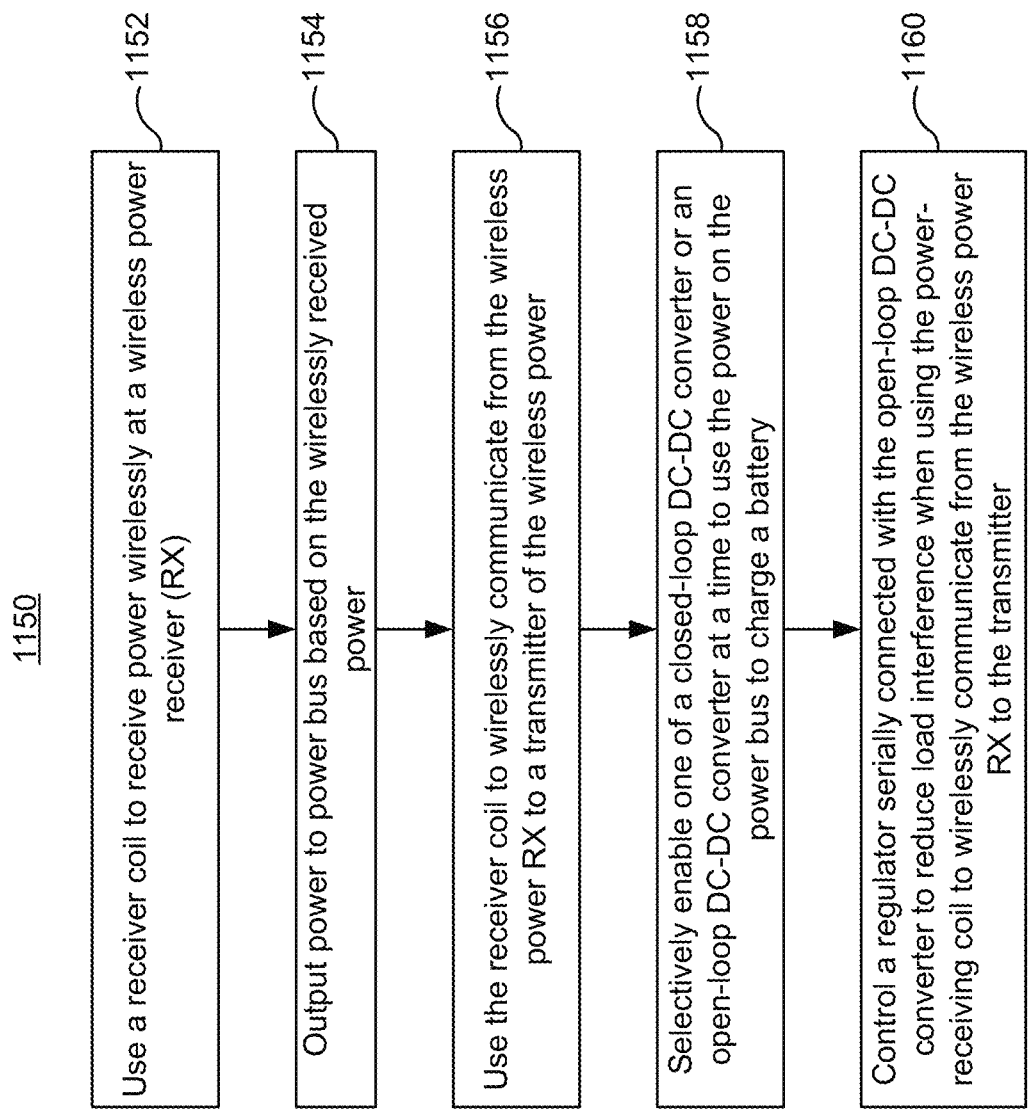
FIG. 11B is a flowchart of one embodiment of a process of operating a wireless power RX and charger using a closed-loop DC-DC converter and an open-loop DC-DC converter.

FIG. 11B is a flowchart of one embodiment of a process 1150 of operating a wireless power RX and charger 342. The process 1100 may be used in any of the wireless power RX and chargers 342 of FIGS. 3, 10A-10C, but is not limited thereto. Step 1152 includes using a receiver coil L2 to receive power wirelessly at a wireless power RXIC 246. The power is transmitted from the wireless power TXIC 226, in one embodiment. The received power is AC power, in one embodiment.

Step 1154 includes the wireless power RXIC 246 outputting power to the power bus 354 based on the wirelessly received power, in one embodiment. The power on the power bus 354 is DC power, in one embodiment. The wireless power RXIC 246 outputs Ibus and Vbus to the power bus 354 based on the wirelessly received power, in one embodiment.

Step 1156 includes using the receiver coil L2 to wirelessly communicate from the wireless power RXIC 246 to a transmitter of the power. The wireless power RXIC 246 uses the receiver coil L2 to communicate with the wireless power TXIC 226, in one embodiment. In one embodiment, the communication is performed in accordance with the Qi-standard.

Step 1158 includes selectively enabling one of a closed-loop DC-DC converter 348 or an open-loop DC-DC converter 350 at a time to use the power output to the power bus 354 by the wireless power RXIC 246 to charge the battery 152.

Step 1158 may include operating the closed-loop DC-DC converter 348 in a constant current phase and/or a constant voltage phase. For example, step 1158 may include operating the closed-loop DC-DC converter 348 between time T1 and T2, as well as time T4 and T5 in FIG. 5. In one embodiment, step 1156 includes operating the closed-loop DC-DC converter 348 in state 606 and/or state 612 in FIG. 6. Step 1156 may also include operating the closed-loop DC-DC converter 348 in a pre-charge phase, as in state 604 of FIG. 6.

Step 1158 may include operating the open-loop DC-DC converter 350 in a constant current phase and/or a constant voltage phase. For example, step 1158 may include operating the open-loop DC-DC converter 350 between times T2 and T4 in FIG. 5. In one embodiment, step 1158 includes operating the open-loop DC-DC converter 350 in state 608 and/or state 610 in FIG. 6.

Step 1160 includes controlling the linear regulator 360, which is serially coupled with the open-loop DC-DC converter 350 to reduce load interference when using the receiver coil L2 to wirelessly communicate from the wireless power RXIC 246 to the transmitter of the power. Step 1160 includes controlling the linear regulator 360 to stabilize a current (Ibus) on the power bus 354 at the output of the wireless power RXIC 246, in one embodiment. Step 1160 includes controlling the linear regulator 360 to stabilize a voltage (Vbus) on the power bus 354 at the output of the wireless power RXIC 246, in one embodiment. Step 1160 includes controlling the linear regulator 360 to stabilize both Ibus and Vbus at the output of the wireless power RXIC 246, in one embodiment. Step 1160 is performed while the open-loop DC-DC converter 350 is enabled to use the wirelessly received power to charge the battery 152. The load interference originates from transient current from load 162, in one embodiment. The transient current may be periodic, as in waveform 802 in FIG. 8A. The frequency of the transient current may be near the frequency of the wireless communication of step 1104, but this is not a requirement.

Figure 12A:
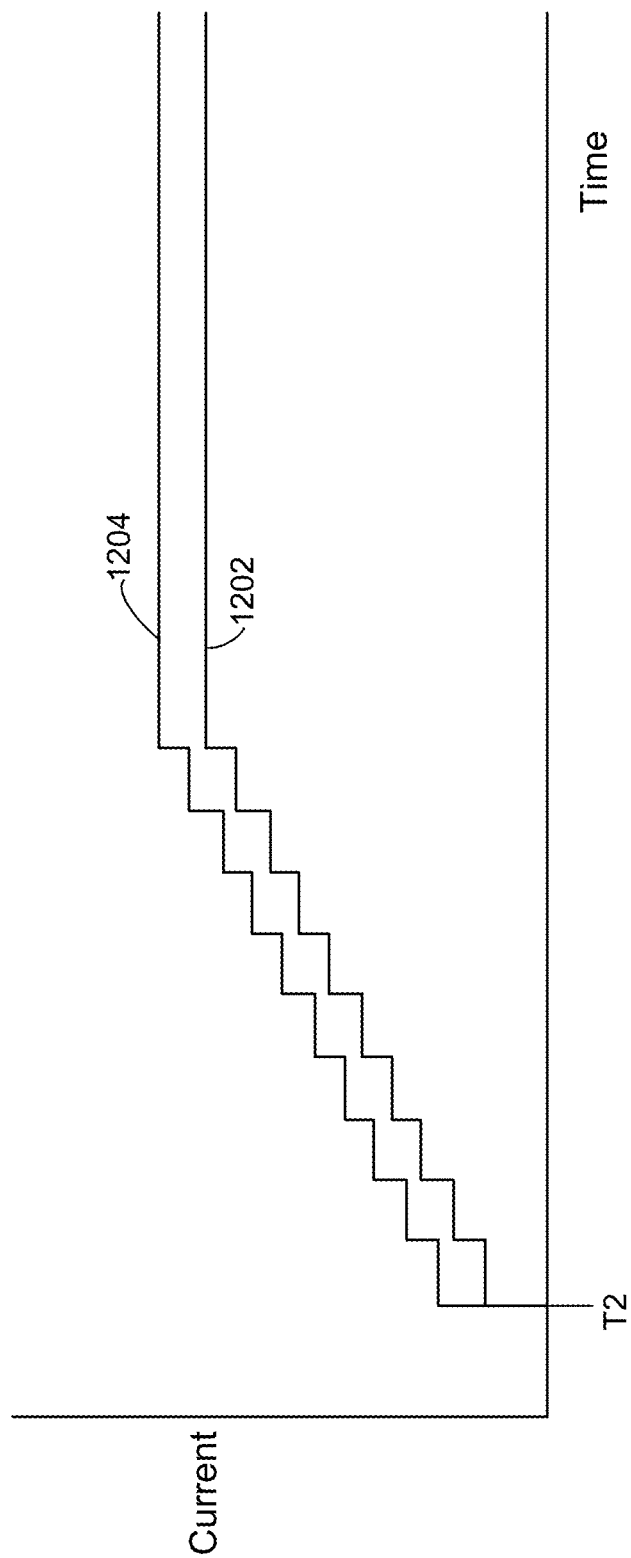
FIG. 12A is a graph that depicts one embodiment of operating the linear regulator in a mode in which the linear regulator does not actively limit a current unless the load draws a transient current.

In one embodiment, the PR controller 344 is configured to operate the linear regulator 360 in a mode in which the linear regulator 360 does not actively limit a current in the linear regulator 360 unless the load 162 draws a transient current while the open-loop DC-DC converter 350 is being used to charge the battery 152. FIG. 12A is a graph that depicts one embodiment of operating the linear regulator 360 in such a mode. The graph shows current versus time. The time range covers the beginning of a constant current phase of operating the open-loop controller 350. For example, the time range in FIG. 12A may correspond to an expansion of approximately T2 in FIG. 5, which shows waveform 506 ramping from 1 A to about 4 A. However, the principles may be applied to other times (and conditions) when operating the operating the open-loop controller 350 to charge the battery 152.

Waveform 1202 represents Ichg under the assumption that there is not a dynamic load. In other words, the load 162 is not drawing a transient current for waveform 1202. The staircase ramp-up of waveform 1202 corresponds to the ramping of waveform 506 (see FIG. 5) from 1 A to about 4 A at time T2, in one embodiment. Note that Ichg is a target current for charging the battery 152, in one embodiment.

Waveform 1204 represents a threshold current magnitude for the linear regulator 360 to enter an active regulation mode. Waveform 1204 is kept slightly higher than waveform 1202, which means that that linear regulator 360 is not in an active regulation mode provided that there is not a transient current from the load 162. However, if there is a transient current from the load 162, then the linear regulator 360 may enter an active regulation mode in which the linear regulator 360 regulates a current within the linear regulator 360. Specifically, the linear regulator 360 may limit its internal current such that it does not exceed the magnitude of waveform 1204.

In one embodiment, the PR controller 344 provides a signal to the linear regulator 360 to establish the threshold current magnitude. Thus, the PR controller 344 is configured to operate the linear regulator 360 in a mode in which a linear regulator threshold current limit is slightly higher than a target battery charging current, in one embodiment. Thus, when there is no transient load current, the linear regulator 360 will not be actively regulating a current. Hence, the resistance of the linear regulator 360 may be very low. Also, the voltage drop across the linear regulator 360 may be very low. Thus, any power loss due to the linear regulator 360 may be very low.

In one embodiment, the PR controller 344 is configured to operate the linear regulator 360 in a mode in which the linear regulator 360 actively limits a current in the linear regulator 360 whether or not the load 162 draws a transient current while the open-loop DC-DC converter 350 is being used to charge the battery 152. FIG. 12B is a graph of the voltage across the linear regulator 360 versus time to illustrate such a mode. The graph shows voltage versus time. The time range covers the beginning of a constant current phase of operating the open-loop controller 350, as in the graph of FIG. 12A. However, the principles may be applied to other times (and conditions) when operating the operating the open-loop controller 350 to charge the battery 152.

Waveform 1222 represents an estimated voltage (Vbus) to establish at the output of the wireless power RXIC 246 in order for the open-loop DC-DC converter 350 to provide a desired current to the battery 152. Waveform 1222 assumes that there is not a dynamic load, and also ignore the linear regulator 360.

Waveform 1224 is an actual target voltage (Vbus) to establish at the output of the wireless power RXIC 246 in order to both meet the charging current goal, as well as to operate the linear regulator 360 in an active regulation mode. Waveform 1224 is about 50-100 millivolts greater than waveform 1222. However, the difference could be less than 50 millivolts or more than 100 millivolts.

This estimated voltage (Vbus) for waveform 1222 may be determined based on factors such as: the gain or equivalent series resistance of the open-loop DC-DC converter 350, a target voltage at the top terminal of the battery 152, a target current (Ibus) at the output of the wireless power RXIC 246, and the equivalent impedance between the output of the wireless power RXIC 246 and the top terminal of the battery 152.

In one embodiment, the linear regulator 360 also provides reverse current protection or reverse blocking (RB). FIG. 13A depicts one embodiment in which the wireless power RX and charger 342 has a linear regulator/RB 1310 that provides for reverse current protection in addition to being a linear regulator 360, as described herein. In one embodiment, the linear regulator/RB 1310 comprises a MOSFET operated in the linear region in order to act as a linear regulator. The configuration in FIG. 13A is similar to the configuration in FIG. 10C in that the linear regulator output (Vout) is connected to the inputs of both the closed-loop DC-DC converter 348 and the open-loop DC-DC converter 350. In another option, the linear regulator/RB is connected to the input of the open-loop DC-DC converter 350 but not the input of the closed-loop DC-DC converter 348.

In one embodiment, the linear regulator 360 also provides over-voltage protection (OVP). FIG. 13B depicts one embodiment in which the wireless power RX and charger 342 has a linear regulator/OVP 1320 that provides for OVP in addition to being a linear regulator 360, as described herein. In one embodiment, the linear regulator/OVP 1320 comprises a MOSFET operated in the linear region in order to act as a linear regulator. The configuration in FIG. 13B is similar to the configuration in FIG. 10C in that the linear regulator output (Vout) is connected to the inputs of both the closed-loop DC-DC converter 348 and the open-loop DC-DC converter 350. In another option, the linear regulator/OVP 1320 is connected to the input of the open-loop DC-DC converter 350 but not the input of the closed-loop DC-DC converter 348.

Certain embodiments of the present technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does not include propagated, modulated, or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for charging a battery using wirelessly received power, the apparatus comprising:
  a wireless power receiver (RX) comprising a receiver coil, the wireless power RX configured to use the receiver coil to receive power wirelessly and to communicate wirelessly to a transmitter of the power, the wireless power RX having an output configured to output power to a bus based on the wirelessly received power;
  an open-loop DC-DC converter having an input coupled to the bus and an output coupled to a terminal configured to be coupled to the battery;

a linear regulator connected along an electrical power pathway from the output of the wireless power RX to the terminal, the electrical power pathway having a portion that passes from the input of the open-loop DC-DC converter to the output of the open-loop DC-DC converter; and a controller configured to enable the open-loop DC-DC converter to use the power output to the bus by the wireless power RX to charge the battery;

the controller further configured to control the linear regulator to stabilize a current in the bus at the output of the wireless power RX to reduce interference to the wireless communication when using the receiver coil to wirelessly communicate from the wireless power RX to the transmitter of the power while the open-loop DC-DC converter is being used to charge the battery.

2. The apparatus of claim 1, wherein the controller is configured to operate the linear regulator in a mode in which the linear regulator does not actively limit a current in the linear regulator unless a load powered by the battery draws a transient current while the open-loop DC-DC converter is being used to charge the battery.

3. The apparatus of claim 1, wherein the controller is configured to operate the linear regulator in a mode in which the linear regulator actively limits a current in the linear regulator whether or not a load powered by the battery draws a transient current while the open-loop DC-DC converter is being used to charge the battery.

4. The apparatus of claim 1, wherein the controller is configured to control the linear regulator based on a target current for charging the battery with the open-loop DC-DC converter.

5. The apparatus of claim 1, wherein:
the linear regulator is between the output of the wireless power RX and the input of the open-loop DC-DC converter.

6. The apparatus of claim 1, wherein:
the linear regulator is between the output of the open-loop DC-DC converter and the terminal configured to be coupled to the battery.

7. The apparatus of claim 1, wherein the linear regulator is integrated with a reverse current protection block for the electrical power pathway.

8. The apparatus of claim 1, wherein the linear regulator is configured to provide over-voltage protection.

9. The apparatus of claim 1, further comprising:
a closed-loop DC-DC converter having an input coupled to the bus and an output configured to be coupled to the terminal that is configured to be coupled to the battery, the electrical power pathway is a first electrical power pathway, the closed-loop DC-DC converter is along a second electrical power pathway from the output of the wireless power RX to the terminal;
the controller is further configured to selectively enable one of the closed-loop DC-DC converter or the open-loop DC-DC converter at a time to use the power output from the wireless power RX to the bus to charge the battery.

10. The apparatus of claim 1, wherein the controller is further configured to control the linear regulator to stabilize a voltage at the bus at the output of the wireless power RX to reduce the interference to the communication.

11. A method of charging a battery using wirelessly received power, the method comprising:
using a receiver coil to receive power wirelessly at a wireless power receiver (RX);

outputting power from an output of the wireless power RX to a bus based on the wirelessly received power;
using the receiver coil to wirelessly communicate from the wireless power RX to a transmitter of the wireless power;
enabling an open-loop DC-DC converter having an input coupled to the bus and an output coupled to a terminal configured to be coupled to a battery to use the power output to the bus by the wireless power RX to charge the battery; and
controlling a linear regulator that is connected in an electrical power pathway from the output of the wireless power RX to the terminal to stabilize a current in the bus at the output of the wireless power RX to reduce interference to the wireless communication when using the receiver coil to wirelessly communicate from the wireless power RX to the transmitter while the open-loop DC-DC converter is being used to charge the battery, the electrical power pathway has a portion that passes from the input of the open-loop DC-DC converter to the output of the open-loop DC-DC converter.

12. The method of claim 11, wherein controlling the linear regulator comprises:
operating the linear regulator in a mode in which the linear regulator does not actively limit a current in the linear regulator unless a load powered by the battery draws a transient current while the open-loop DC-DC converter is being used to charge the battery.

13. The method of claim 11, wherein controlling the linear regulator comprises:
establishing a voltage on the bus at the output of the wireless power RX to establish a voltage drop across the linear regulator to cause the linear regulator to be in a current limiting mode whether or not a load powered by the battery draws a transient current while the open-loop DC-DC converter is being used to charge the battery.

14. The method claim 11, wherein controlling the linear regulator comprises:
controlling the linear regulator to limit a current from the output of the open-loop DC-DC converter based on a target battery charging current.

15. An apparatus for charging a battery using wirelessly received power, the apparatus comprising:
a power bus;
a wireless power receiver (RX) comprising a receiver coil, the wireless power RX configured to use the receiver coil to receive power wirelessly and to communicate wirelessly to a transmitter of the power, the wireless power receiver configured to output direct current (DC) power to the power bus based on the wirelessly received power;
a closed-loop DC-DC converter having an input coupled to the power bus and an output configured to be coupled to the battery;
an open-loop DC-DC converter having an input coupled to the power bus and an output configured to be coupled to the battery;
a linear regulator coupled serially with the open-loop DC-DC converter; and
a controller configured to selectively enable one of the closed-loop DC-DC converter or the open-loop DC-DC converter at a time to use the DC power output to the bus by the wireless power RX to charge the battery;
the controller further configured to control the linear regulator to stabilize a current on the bus at the output of the wireless power RX to reduce interference to the wireless communication caused by transient load current when using the receiver coil to wirelessly communicate from the wireless power RX to the transmitter of the power while the open-loop DC-DC converter is being used to charge the battery.

16. The apparatus of claim 15, wherein the controller is configured to operate the linear regulator in a mode in which the linear regulator does not actively limit current unless a load powered by the battery draws a transient current while the open-loop DC-DC converter is being used to charge the battery.

17. The apparatus of claim 15, wherein the controller is configured to operate the linear regulator in a mode in which the linear regulator actively limits current whether or not a load powered by the battery draws a transient current while the open-loop DC-DC converter is being used to charge the battery.

18. The apparatus of claim 15, wherein the controller is configured to control the linear regulator based on a target current for charging the battery with the open-loop DC-DC converter.

19. The apparatus of claim 15, wherein:
the linear regulator is between the output of the wireless power RX and the input of the open-loop DC-DC converter.

20. The apparatus of claim 15, wherein:
the linear regulator is between the output of the open-loop DC-DC converter and the battery.

* * * * *